United States Patent
Hosseini et al.

(10) Patent No.: US 12,336,058 B2
(45) Date of Patent: Jun. 17, 2025

(54) CAPABILITY SIGNALING FOR PHYSICAL UPLINK SHARED CHANNEL REPETITION

(71) Applicant: QUALCOMM Incorporated, San Diego, CA (US)

(72) Inventors: Seyedkianoush Hosseini, San Diego, CA (US); Enoch Shiao-Kuang Lu, San Diego, CA (US); Peter Gaal, San Diego, CA (US); Aamod Khandekar, San Diego, CA (US); Seyed Ali Akbar Fakoorian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/346,666

(22) Filed: Jul. 3, 2023

(65) Prior Publication Data
US 2024/0098485 A1 Mar. 21, 2024

Related U.S. Application Data

(63) Continuation of application No. 17/002,657, filed on Aug. 25, 2020, now Pat. No. 11,736,933.
(Continued)

(51) Int. Cl.
*H04W 8/24* (2009.01)
*H04W 16/14* (2009.01)
(Continued)

(52) U.S. Cl.
CPC ............. *H04W 8/24* (2013.01); *H04W 16/14* (2013.01); *H04W 72/0446* (2013.01);
(Continued)

(58) Field of Classification Search
CPC ... H04W 8/24; H04W 16/14; H04W 72/0446; H04W 72/10; H04W 72/1268; H04W 72/14
See application file for complete search history.

(56) References Cited

U.S. PATENT DOCUMENTS 9,692,575 B2   6/2017   Kwak et al.
2016/0112892 A1   4/2016   Damnjanovic et al.
(Continued)

FOREIGN PATENT DOCUMENTS

CA       3065550 A1 * 12/2018 ........... H04L 5/0094
CN     110063039 A      7/2019
(Continued)

OTHER PUBLICATIONS

Ericsson: "HARQ Timing for Enhanced Coverage MTC UE", 3GPP TSG RAN WG1 Meeting #76, R1-140747, Prague, Czech Republic, Feb. 10, 2014-Feb. 14, 2014, Feb. 1, 2014, pp. 1-3.
(Continued)

*Primary Examiner* — Saad A. Waqas
(74) *Attorney, Agent, or Firm* — Holland & Hart LLP

(57) ABSTRACT

The techniques described herein may provide for sub-slot based physical uplink shared channel (PUSCH) repetition (i.e., back-to-back PUSCH repetition within a slot) according to user equipment (UE) capability. A UE may employ uplink data repetition capability reporting for base station scheduling of uplink data repetition and base station management of the number of transport blocks (TBs) that a UE supports (e.g., processes and transmits for uplink) on a per-slot basis. According to the techniques described herein, a UE may indicate whether it supports mini-slot repetition (e.g., for ultra-reliable low-latency communication (URLLC), enhanced mobile broadband (eMBB), or both) via an uplink data repetition capability report. The uplink data repetition capability report may further indicate a maximum number of supported repetitions per TB, a number of supported TBs per slot, etc., such that a base station may configure or schedule PUSCH repetition based on the UE's reported capability.

30 Claims, 18 Drawing Sheets

Related U.S. Application Data

(60) Provisional application No. 62/891,907, filed on Aug. 26, 2019.

(51) Int. Cl.
*H04W 72/0446* (2023.01)
*H04W 72/1268* (2023.01)
*H04W 72/23* (2023.01)
*H04W 72/56* (2023.01)

(52) U.S. Cl.
CPC ....... *H04W 72/1268* (2013.01); *H04W 72/23* (2023.01); *H04W 72/56* (2023.01)

(56) References Cited

U.S. PATENT DOCUMENTS

| | | | |
|---|---|---|---|
| 2016/0211949 A1 | 7/2016 | You et al. | |
| 2019/0230599 A1 | 7/2019 | Nam et al. | |
| 2020/0259896 A1* | 8/2020 | Sachs | H04W 12/06 |
| 2021/0067950 A1 | 3/2021 | Hosseini et al. | |

FOREIGN PATENT DOCUMENTS

| | | | | |
|---|---|---|---|---|
| EP | 3855650 A1 * | 7/2021 | | H04L 1/08 |
| EP | 3876647 A1 * | 9/2021 | | H04B 17/309 |
| GB | 2546548 A | 7/2017 | | |
| WO | WO-2016061382 A1 | 4/2016 | | |
| WO | WO-2017125037 A1 | 7/2017 | | |
| WO | WO-2019160464 A1 | 8/2019 | | |
| WO | 2019217912 | 11/2019 | | |
| WO | WO-2020057566 A1 | 3/2020 | | |
| WO | WO-2020063408 A1 * | 4/2020 | | H04L 27/26025 |

OTHER PUBLICATIONS

LG Electronics: "Discussion on UE Feature for URLLC Services", 3GPP TSG RAN Meeting #81, RP-181991, Gold Coast Australia, Sep. 10, 2018-Sep. 14, 2018, Sep. 8, 2018, 2 pages.
Huawei, et al., "UE Capability on PDSCH/PUSCH Repetition," 3GPP Draft, 3GPP TSG RAN WG1 Meeting #93, R1-1806451, 3rd Generation Partnership Project (3GPP), Mobile Competence Centre, 650, Route Des Lucioles, F-06921, Sophia-Antipolis Cedex, France, vol. RAN WG1 No., Busan, Korea; May 21, 2018-May 25, 2018, May 20, 2018 (May 20, 2018), XP051441655, 2 pages, the whole document.
International Preliminary Report On Patentability—PCT/US2020/047897, the International Bureau of WIPO—Geneva, Switzerland, Mar. 10, 2022.
International Search Report and Written Opinion—PCT/US2020/047897—ISA/EPO—Oct. 15, 2020.
"R1-1809619 Rel-15 LTE UE Feature List_rm", 3GPP Draft; R1-1809619, REL-15 LTE UE Feature List_RM, 3rd Generation Partnership Project (3GPP), Mobile Competence Centre; 650, Route Des Lucioles, F-06921 Sophia-Antipolis Cedex, France, Aug. 23, 2018 (Aug. 23, 2018), 21 Pages, XP051516980, pp. 6-7, the Whole Document.
SAMSUNG: "Scheduling/HARQ Enhancement for eURLLC," 3GPP Draft, 3GPP TSG RAN WG1 #98, R1-1908493, Eurllc SCHEDULING HARQ, 3rd Generation Partnership Project (3GPP), Mobile Competence Centre, 650, Route Des Lucioles, F-06921, Sophia-Antipolis Cedex, France, vol. RAN WG1, No. Prague, Czech Republic, Aug. 26, 2019-Aug. 30, 2019, Aug. 16, 2019 (Aug. 16, 2019), XP051765101, 6 pages, the whole document.
Spreadtrum Communications: "Discussion on PUSCH Enhancements for URLLC," 3GPP Draft, 3GPP TSG RAN WG1 Meeting #97, R1-1906379, Discussion on PUSCH Enhancements for URLLC, 3rd Generation Partnership Project (3GPP), Mobile Competence Centre, 650, Route Des Lucioles, F-06921, Sophia-Antipolis Cedex, France, vol. RAN WG1 No., Reno, USA, May 13, 2019-May 17, 2019, May 13, 2019 (May 13, 2019), XP051727829, 4 pages, the whole document.

* cited by examiner

CAPABILITY SIGNALING FOR PHYSICAL UPLINK SHARED CHANNEL REPETITION

CROSS REFERENCE

The present Application for Patent is a Continuation of U.S. patent application Ser. No. 17/002,657 by HOSSEINI et al, entitled "CAPABILITY SIGNALING FOR PHYSICAL UPLINK SHARED CHANNEL REPETITION" filed Aug. 25, 2020, which claims the benefit of U.S. Provisional Patent Application No. 62/891,907 by HOSSEINI et al., entitled "CAPABILITY SIGNALING FOR PHYSICAL UPLINK SHARED CHANNEL REPETITION," filed Aug. 26, 2019, each of which is assigned to the assignee hereof, and each of which is expressly incorporated by reference herein.

BACKGROUND

The following relates generally to wireless communications, and more specifically to capability signaling for physical uplink shared channel (PUSCH) repetition.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some wireless communications systems, a base station may configure a UE to transmit the same uplink message in multiple uplink channel repetitions to increase chances that the base station can successfully decode the uplink message. For example, if the UE transmits the uplink message once on a single uplink channel, different interferences (e.g., caused by other transmissions occurring at the same time as the single uplink channel) may impact the uplink message received at the base station. Accordingly, a UE transmitting the same uplink message in multiple uplink channel repetitions may increase the chances an instance of the uplink message is successfully received by the base station, may enable the base station to combine multiple instances of the same uplink message (e.g., such that the impact of interference may be reduced), etc.

SUMMARY

The described techniques relate to improved methods, systems, devices, and apparatuses that support capability signaling for physical uplink shared channel (PUSCH) repetition. Generally, the described techniques provide for sub-slot based PUSCH repetition (i.e., back-to-back PUSCH repetition within a slot) according to user equipment (UE) capability.

A UE may employ uplink data repetition capability reporting for base station scheduling of uplink data repetition and for base station management of the number of transport blocks (TBs) that a UE supports (e.g., processes and transmits for uplink) on a per-slot basis. According to the techniques described herein, a UE may indicate whether it supports mini-slot repetition (e.g., for ultra-reliable low-latency communication (URLLC), enhanced mobile broadband (eMBB), or both) by transmitting an uplink data repetition capability report to a base station. The uplink data repetition capability report may further indicate a maximum number of supported repetitions per TB, a number of supported TBs per slot, etc., such that the base station may configure or schedule PUSCH repetition (e.g., within a slot) based on the UE's reported capability. In some cases, UE capability signaling for PUSCH repetition may be conducted on a per-band basis (e.g., a UE may report PUSCH repetition capability in a given band of a band combination configured for the UE). According to some aspects of the described techniques, PUSCH repetition capability reporting may be performed for different services (e.g., for URLLC and eMBB) separately (e.g., individually) or jointly. Additionally or alternatively, PUSCH repetition capability reporting may be indicated for different channel priorities of PUSCH transmissions (e.g., corresponding to URLLC and eMBB transmissions) separately (e.g., individually) or jointly.

A method of wireless communications at a UE is described. The method may include transmitting an uplink data repetition capability report to a base station, where the uplink data repetition capability report includes at least an indication of a number of data repetitions supported per transport block and a number of transport blocks supported per slot. The method may further include receiving, from a base station, signaling including an uplink grant for one or more data repetitions based on the transmitted uplink data repetition capability report, and transmitting, to the base station, the one or more data repetitions based on the uplink grant.

An apparatus for wireless communications at a UE is described. The apparatus may include a processor, memory coupled with the processor, and instructions stored in the memory. The instructions may be executable by the processor to cause the apparatus to transmit an uplink data repetition capability report to a base station, where the uplink data repetition capability report includes at least an indication of a number of data repetitions supported per transport block and a number of transport blocks supported per slot. The instructions may be executable by the processor to further cause the apparatus to receive, from a base station, signaling including an uplink grant for one or more data repetitions based on the transmitted uplink data repetition capability report, and transmit, to the base station, the one or more data repetitions based on the uplink grant.

Another apparatus for wireless communications at a UE is described. The apparatus may include means for transmitting an uplink data repetition capability report to a base station, where the uplink data repetition capability report includes at least an indication of a number of data repetitions supported per transport block and a number of transport blocks supported per slot, receiving, from a base station, signaling including an uplink grant for one or more data repetitions based on the transmitted uplink data repetition capability report, and transmitting, to the base station, the one or more data repetitions based on the uplink grant.

A non-transitory computer-readable medium storing code for wireless communications at a UE is described. The code may include instructions executable by a processor to transmit an uplink data repetition capability report to a base station, where the uplink data repetition capability report includes at least an indication of a number of data repetitions supported per transport block and a number of transport blocks supported per slot, receive, from a base station, signaling including an uplink grant for one or more data repetitions based on the transmitted uplink data repetition capability report, and transmit, to the base station, the one or more data repetitions based on the uplink grant.

Some examples of the method, apparatuses, and non-transitory computer-readable medium described herein may further include operations, features, means, or instructions for identifying one or more bands of a configured band combination, and determining the uplink data repetition capability report based on a first band of the one or more bands, where the uplink data repetition capability report includes an indication that uplink data repetition may be supported in the first band. Some examples of the method, apparatuses, and non-transitory computer-readable medium described herein may further include operations, features, means, or instructions for identifying a first configured service type, where the uplink data repetition capability report may be determined based on the first configured service type. In some examples of the method, apparatuses, and non-transitory computer-readable medium described herein, the uplink data repetition capability report includes an indication of the first service type.

Some examples of the method, apparatuses, and non-transitory computer-readable medium described herein may further include operations, features, means, or instructions for determining a second uplink data repetition capability report based on a second band of the one or more bands, and transmitting, to the base station, the second uplink data repetition capability report, where the second uplink data repetition capability report includes an indication that uplink data repetition may be supported in the second band according to the second uplink data repetition capability report.

Some examples of the method, apparatuses, and non-transitory computer-readable medium described herein may further include operations, features, means, or instructions for identifying a first configured service type and a second configured service type, and determining the uplink data repetition capability report based on the first configured service type and the second configured service type. In some examples of the method, apparatuses, and non-transitory computer-readable medium described herein, determining the uplink data repetition capability report based on the first configured service type and the second configured service type may include operations, features, means, or instructions for determining the number of transport blocks supported per slot based on the first configured service type and the second configured service type.

In some examples of the method, apparatuses, and non-transitory computer-readable medium described herein, the uplink data repetition capability report includes an indication of whether the UE supports uplink data repetition for the first configured service type, an indication of whether the UE supports uplink data repetition for the second configured service type, an indication of a number of transport blocks supported per slot for the first service type, an indication of a number of transport blocks supported per slot for the second service type, or some combination thereof. In some examples of the method, apparatuses, and non-transitory computer-readable medium described herein, the first service type includes an enhanced mobile broadband service type and the second service type includes an ultra-reliable low-latency communication service type.

Some examples of the method, apparatuses, and non-transitory computer-readable medium described herein may further include operations, features, means, or instructions for determining a gap between non-repeated uplink data transmissions, where the uplink data repetition capability report includes an indication of the gap. Some examples of the method, apparatuses, and non-transitory computer-readable medium described herein may further include operations, features, means, or instructions for determining the uplink data repetition capability report based on the determined gap. In some examples of the method, apparatuses, and non-transitory computer-readable medium described herein, determining the uplink data repetition capability report based on the determined gap may include operations, features, means, or instructions for determining the number of transport blocks supported per slot based on reducing a second number of transport blocks supported per slot according to the gap, where the second number of transport blocks supported per slot may be associated with non-repeated uplink data transmissions supported per slot.

In some examples of the method, apparatuses, and non-transitory computer-readable medium described herein, the uplink data repetition capability report includes an indication of a minimum length of each repetition bundle including data repetitions. In some examples of the method, apparatuses, and non-transitory computer-readable medium described herein, the gap may be determined based on a configured subcarrier spacing, one or more processing capabilities of the UE, or some combination thereof. Some examples of the method, apparatuses, and non-transitory computer-readable medium described herein may further include operations, features, means, or instructions for identifying a first configured service type, where the gap may be determined based on the first configured service type.

In some examples of the method, apparatuses, and non-transitory computer-readable medium described herein, the indication of the number of data repetitions supported per transport block and the number of transport blocks supported per slot includes an indication of a number of physical uplink shared channel repetitions and a number of physical uplink shared channels per slot.

A method of wireless communications at a base station is described. The method may include receiving an uplink data repetition capability report from a UE, where the uplink data repetition capability report includes at least an indication of a number of data repetitions per transport block supported by the UE and a number of transport blocks per slot supported by the UE, transmitting, to the UE, signaling including an uplink grant for one or more data repetitions based on the received uplink data repetition capability report, and receiving, from the UE, the one or more data repetitions based on the uplink grant.

An apparatus for wireless communications at a base station is described. The apparatus may include a processor, memory coupled with the processor, and instructions stored in the memory. The instructions may be executable by the processor to cause the apparatus to receive an uplink data repetition capability report from a UE, where the uplink data repetition capability report includes at least an indication of a number of data repetitions per transport block supported by the UE and a number of transport blocks per slot supported by the UE, transmit, to the UE, signaling including an uplink grant for one or more data repetitions based on the received uplink data repetition capability report, and receive, from the UE, the one or more data repetitions based on the uplink grant.

Another apparatus for wireless communications at a base station is described. The apparatus may include means for receiving an uplink data repetition capability report from a UE, where the uplink data repetition capability report includes at least an indication of a number of data repetitions per transport block supported by the UE and a number of transport blocks per slot supported by the UE, transmitting, to the UE, signaling including an uplink grant for one or more data repetitions based on the received uplink data repetition capability report, and receiving, from the UE, the one or more data repetitions based on the uplink grant.

A non-transitory computer-readable medium storing code for wireless communications at a base station is described. The code may include instructions executable by a processor to receive an uplink data repetition capability report from a UE, where the uplink data repetition capability report includes at least an indication of a number of data repetitions per transport block supported by the UE and a number of transport blocks per slot supported by the UE, transmit, to the UE, signaling including an uplink grant for one or more data repetitions based on the received uplink data repetition capability report, and receive, from the UE, the one or more data repetitions based on the uplink grant.

In some examples of the method, apparatuses, and non-transitory computer-readable medium described herein, the uplink data repetition capability report includes an indication that uplink data repetition may be supported in a first band of one or more bands of a configured band combination. Some examples of the method, apparatuses, and non-transitory computer-readable medium described herein may further include operations, features, means, or instructions for receiving, from the UE, a second uplink data repetition capability report, where the second uplink data repetition capability report includes an indication that uplink data repetition may be supported in a second band according to the second uplink data repetition capability report.

In some examples of the method, apparatuses, and non-transitory computer-readable medium described herein, the uplink data repetition capability report includes an indication of the a service type associated with the uplink data repetition capability report. In some examples of the method, apparatuses, and non-transitory computer-readable medium described herein, the uplink data repetition capability report includes an indication of a first service type associated with the uplink data repetition capability report and an indication of a second service type associated with the uplink data repetition capability report.

Some examples of the method, apparatuses, and non-transitory computer-readable medium described herein may further include operations, features, means, or instructions for receiving, from the UE, a second uplink data repetition capability report, where the second uplink data repetition capability report includes an indication of a second service type associated with the second uplink data repetition capability report. In some examples of the method, apparatuses, and non-transitory computer-readable medium described herein, the uplink data repetition capability report includes an indication of whether the UE supports uplink data repetition for the first configured service type, an indication of whether the UE supports uplink data repetition for the second configured service type, an indication of a number of transport blocks per slot supported by the UE for the first service type, an indication of a number of transport blocks per slot supported by the UE for the second service type, or some combination thereof.

In some examples of the method, apparatuses, and non-transitory computer-readable medium described herein, the first service type includes an enhanced mobile broadband service type and the second service type includes an ultra-reliable low-latency communication service type. In some examples of the method, apparatuses, and non-transitory computer-readable medium described herein, the uplink data repetition capability report includes an indication of a gap between non-repeated uplink data transmissions, an indication of a minimum length of each repetition bundle including data repetitions, or both.

In some examples of the method, apparatuses, and non-transitory computer-readable medium described herein, the indication of the number of data repetitions per transport block supported by the UE and the number of transport blocks per slot supported by the UE includes an indication of a number of physical uplink shared channel repetitions supported by the UE and a number of physical uplink shared channels per slot supported by the UE.

A method of wireless communications at a UE is described. The method may include transmitting an uplink data repetition capability report to a base station, where the uplink data repetition capability report includes an indication of a number of PUSCH transmissions supported per slot, the number of PUSCH transmissions being associated with a number of PUSCH and a number of transport blocks supported per slot, receiving, from a base station, signaling including an uplink grant for one or more PUSCH repetitions based on the transmitted uplink data repetition capability report, and transmitting, to the base station, the one or more PUSCH repetitions based on the uplink grant.

An apparatus for wireless communications at a UE is described. The apparatus may include a processor, memory coupled with the processor, and instructions stored in the memory. The instructions may be executable by the processor to cause the apparatus to transmit an uplink data repetition capability report to a base station, where the uplink data repetition capability report includes an indication of a number of PUSCH transmissions supported per slot, the number of PUSCH transmissions being associated with a number of PUSCH and a number of transport blocks supported per slot, receive, from a base station, signaling including an uplink grant for one or more PUSCH repetitions based on the transmitted uplink data repetition capability report, and transmit, to the base station, the one or more PUSCH repetitions based on the uplink grant.

Another apparatus for wireless communications at a UE is described. The apparatus may include means for transmitting an uplink data repetition capability report to a base station, where the uplink data repetition capability report includes an indication of a number of PUSCH transmissions supported per slot, the number of PUSCH transmissions being associated with a number of PUSCH and a number of transport blocks supported per slot, receiving, from a base station, signaling including an uplink grant for one or more PUSCH repetitions based on the transmitted uplink data repetition capability report, and transmitting, to the base station, the one or more PUSCH repetitions based on the uplink grant.

A non-transitory computer-readable medium storing code for wireless communications at a UE is described. The code may include instructions executable by a processor to transmit an uplink data repetition capability report to a base station, where the uplink data repetition capability report includes an indication of a number of PUSCH transmissions supported per slot, the number of PUSCH transmissions being associated with a number of PUSCH and a number of transport blocks supported per slot, receive, from a base station, signaling including an uplink grant for one or more PUSCH repetitions based on the transmitted uplink data repetition capability report, and transmit, to the base station, the one or more PUSCH repetitions based on the uplink grant.

Some examples of the method, apparatuses, and non-transitory computer-readable medium described herein may further include operations, features, means, or instructions for identifying one or more bands of a configured band combination, and determining the uplink data repetition capability report based on a first band of the one or more bands, where the uplink data repetition capability report includes an indication that uplink data repetition may be supported in the first band.

Some examples of the method, apparatuses, and non-transitory computer-readable medium described herein may further include operations, features, means, or instructions for identifying a first channel priority of a first PUSCH, where the uplink data repetition capability report may be determined based on the first channel priority of the first PUSCH.

In some examples of the method, apparatuses, and non-transitory computer-readable medium described herein, the uplink data repetition capability report includes an indication associated with the first channel priority of the first PUSCH.

Some examples of the method, apparatuses, and non-transitory computer-readable medium described herein may further include operations, features, means, or instructions for determining the uplink data repetition capability report based on a second band of the one or more bands, where the uplink data repetition capability report includes an indication of a number of PUSCH transmissions supported per slot for the second band.

Some examples of the method, apparatuses, and non-transitory computer-readable medium described herein may further include operations, features, means, or instructions for identifying a first channel priority of a first PUSCH and a second channel priority of a second PUSCH, and determining the uplink data repetition capability report based on the first channel priority of the first PUSCH and the second channel priority of the second PUSCH.

In some examples of the method, apparatuses, and non-transitory computer-readable medium described herein, determining the uplink data repetition capability report based on the first channel priority of the first PUSCH and the second channel priority of the second PUSCH may include operations, features, means, or instructions for determining the number of transport blocks supported per slot based on the first channel priority of the first PUSCH and the second channel priority of the second PUSCH.

In some examples of the method, apparatuses, and non-transitory computer-readable medium described herein, the uplink data repetition capability report includes an indication of whether the UE supports PUSCH repetition for the first channel priority of the first PUSCH, an indication of whether the UE supports PUSCH repetition for the second channel priority of the second PUSCH, an indication of a number of transport blocks supported per slot for the first channel priority of the first PUSCH, an indication of a number of transport blocks supported per slot for the second channel priority of the second PUSCH, or some combination thereof.

In some examples of the method, apparatuses, and non-transitory computer-readable medium described herein, the first channel priority of the first PUSCH corresponds to an enhanced mobile broadband service and the second channel priority of the second PUSCH corresponds to an ultra-reliable low-latency communication service.

Some examples of the method, apparatuses, and non-transitory computer-readable medium described herein may further include operations, features, means, or instructions for determining a gap between non-repeated PUSCH transmissions, where the uplink data repetition capability report includes an indication of the gap.

Some examples of the method, apparatuses, and non-transitory computer-readable medium described herein may further include operations, features, means, or instructions for determining the uplink data repetition capability report based on the determined gap.

Some examples of the method, apparatuses, and non-transitory computer-readable medium described herein may further include operations, features, means, or instructions for determining the uplink data repetition capability report based on a configured subcarrier spacing, one or more processing capabilities of the UE, or some combination thereof.

In some examples of the method, apparatuses, and non-transitory computer-readable medium described herein, the indication of the number of PUSCH transmissions supported per slot includes an indication of a number of PUSCH repetitions and a number of PUSCH per slot.

A method of wireless communications at a base station is described. The method may include receiving an uplink data repetition capability report from a UE, where the uplink data repetition capability report includes an indication of a number of PUSCH transmissions supported per slot supported by the UE, the number of PUSCH transmissions being associated with a number of PUSCH repetitions supported by the UE and a number of transport blocks supported per slot supported by the UE, transmitting, to the UE, signaling including an uplink grant for one or more PUSCH repetitions based on the received uplink data repetition capability report, and receiving, from the UE, the one or more PUSCH repetitions based on the uplink grant.

An apparatus for wireless communications at a base station is described. The apparatus may include a processor, memory coupled with the processor, and instructions stored in the memory. The instructions may be executable by the processor to cause the apparatus to receive an uplink data repetition capability report from a UE, where the uplink data repetition capability report includes an indication of a number of PUSCH transmissions supported per slot supported by the UE, the number of PUSCH transmissions being associated with a number of PUSCH repetitions supported by the UE and a number of transport blocks supported per slot supported by the UE, transmit, to the UE, signaling including an uplink grant for one or more PUSCH repetitions based on the received uplink data repetition capability report, and receive, from the UE, the one or more PUSCH repetitions based on the uplink grant.

Another apparatus for wireless communications at a base station is described. The apparatus may include means for receiving an uplink data repetition capability report from a UE, where the uplink data repetition capability report includes an indication of a number of PUSCH transmissions supported per slot supported by the UE, the number of PUSCH transmissions being associated with a number of PUSCH repetitions supported by the UE and a number of transport blocks supported per slot supported by the UE, transmitting, to the UE, signaling including an uplink grant for one or more PUSCH repetitions based on the received uplink data repetition capability report, and receiving, from the UE, the one or more PUSCH repetitions based on the uplink grant.

A non-transitory computer-readable medium storing code for wireless communications at a base station is described. The code may include instructions executable by a processor to receive an uplink data repetition capability report from a UE, where the uplink data repetition capability report includes an indication of a number of PUSCH transmissions supported per slot supported by the UE, the number of PUSCH transmissions being associated with a number of PUSCH repetitions supported by the UE and a number of transport blocks supported per slot supported by the UE, transmit, to the UE, signaling including an uplink grant for one or more PUSCH repetitions based on the received uplink data repetition capability report, and receive, from the UE, the one or more PUSCH repetitions based on the uplink grant.

In some examples of the method, apparatuses, and non-transitory computer-readable medium described herein, the uplink data repetition capability report includes an indication that uplink data repetition may be supported in a first band of one or more bands of a configured band combination.

In some examples of the method, apparatuses, and non-transitory computer-readable medium described herein, the uplink data repetition capability report includes an indication of a number of PUSCH transmissions supported per slot for a second band of the one or more bands.

In some examples of the method, apparatuses, and non-transitory computer-readable medium described herein, the uplink data repetition capability report includes an indication of a PUSCH associated with the uplink data repetition capability report.

In some examples of the method, apparatuses, and non-transitory computer-readable medium described herein, the uplink data repetition capability report includes an indication of a first channel priority of a first PUSCH associated with the uplink data repetition capability report and an indication of a second channel priority of a second PUSCH associated with the uplink data repetition capability report.

In some examples of the method, apparatuses, and non-transitory computer-readable medium described herein, the uplink data repetition capability report includes an indication of whether the UE supports PUSCH repetition for the first channel priority of the first PUSCH, an indication of whether the UE supports PUSCH repetition for the second channel priority of the second PUSCH, an indication of a number of transport blocks supported per slot for the first channel priority of the first PUSCH, an indication of a number of transport blocks supported per slot for the second channel priority of the second PUSCH, or some combination thereof.

In some examples of the method, apparatuses, and non-transitory computer-readable medium described herein, the first channel priority of the first PUSCH corresponds to an enhanced mobile broadband service and the second channel priority of the second PUSCH corresponds to an ultra-reliable low-latency communication service.

In some examples of the method, apparatuses, and non-transitory computer-readable medium described herein, the uplink data repetition capability report includes an indication of a gap between non-repeated PUSCH transmissions, an indication of a minimum length of each repetition bundle including PUSCH repetitions, or both.

In some examples of the method, apparatuses, and non-transitory computer-readable medium described herein, the uplink data repetition capability report includes an indication of a configured subcarrier spacing, one or more processing capabilities of the UE, or some combination thereof associated with the number of PUSCH transmissions per slot supported by the UE.

In some examples of the method, apparatuses, and non-transitory computer-readable medium described herein, the indication of the number of PUSCH transmissions per slot supported by the UE includes an indication of a number of PUSCH repetitions supported by the UE and a number of PUSCH per slot supported by the UE.

DETAILED DESCRIPTION

Figure 1:
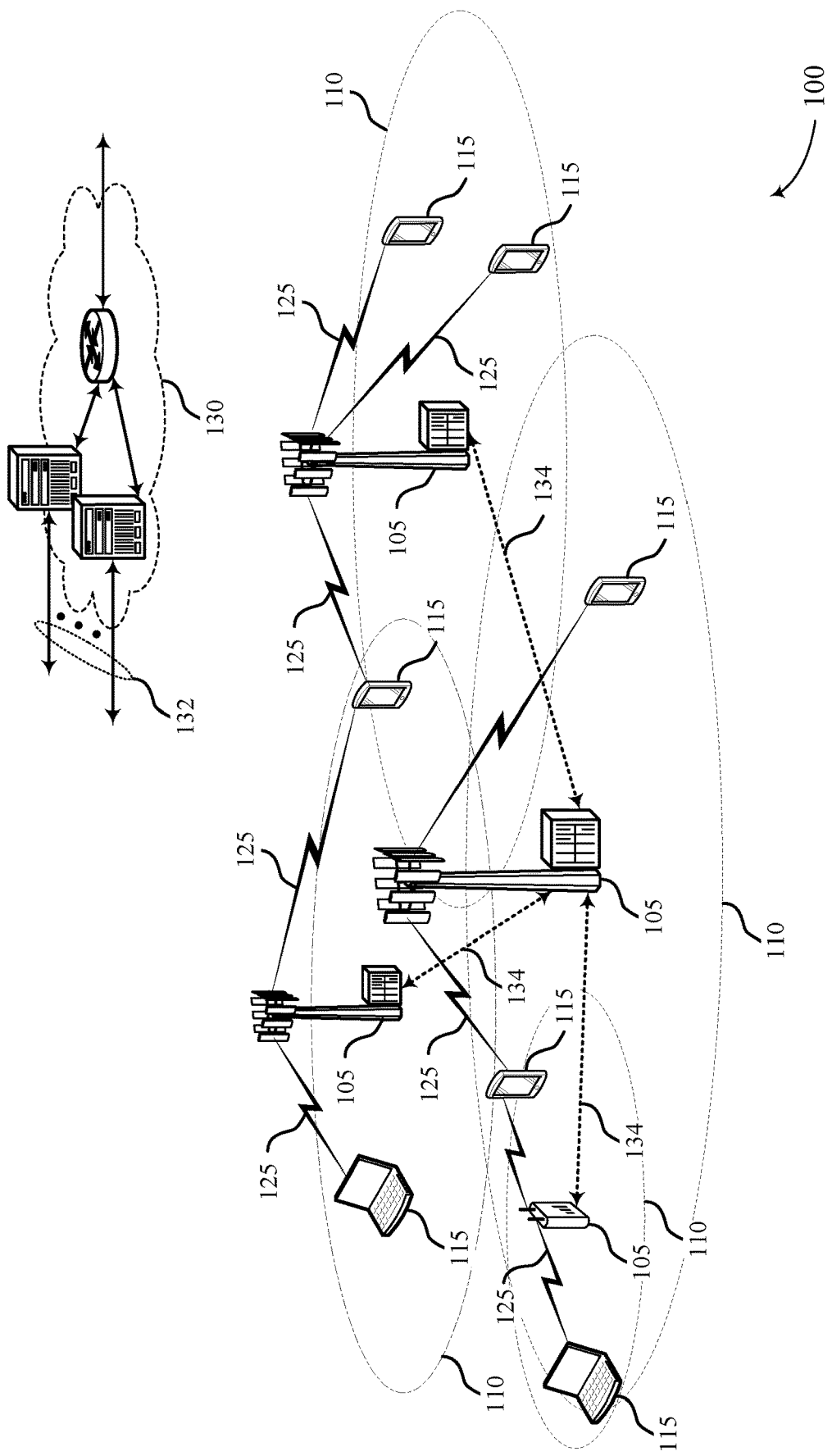
FIG. 1 illustrates an example of a system for wireless communications that supports capability signaling for physical uplink shared channel (PUSCH) repetition in accordance with aspects of the present disclosure.

Some wireless communication systems may include user equipments (UEs) served by one or more base stations. For example, base stations such as next-generation NodeBs or giga-NodeBs (either of which may be referred to as a gNB) may support wireless communications according to one or more radio access technologies, such as fourth generation (4G) systems including Long Term Evolution (LTE) systems, LTE-Advanced (LTE-A) systems, or LTE-A Pro systems, and fifth generation (5G) systems which may be referred to as New Radio (NR) systems. In some wireless communication systems (e.g., in NR systems), UEs may support repetition of uplink transmissions, such as physical uplink shared channel (PUSCH) repetitions, to improve reliability of communications, to increase coverage of uplink transmissions, etc. As such, a UE may be configured to transmit an uplink message according to an uplink channel (e.g., PUSCH) repetition scheme. For example, in some cases, a UE may operate at a lower transmit power or on a smaller bandwidth than other (e.g., conventional) UEs, and a base station may configure uplink channel repetitions for the UE to transmit an uplink message to the base station.

In some cases, uplink channel repetitions may increase the chances that the base station correctly receives and decodes the uplink message (e.g., based on the additional opportunities for the base station to correctly receive an instance of the repeated uplink transmissions, based on the base station combining the uplink channel repetitions, etc.). For example, for UEs configured with lower transmit power and/or smaller bandwidth, uplink transmissions from the UE may be more susceptible to interferences from other transmissions occurring on the same bandwidths (e.g., from nearby UEs, other base stations, etc.), and a base station may configure PUSCH repetitions to improve the reliability of such uplink transmissions.

Wireless communications systems may support PUSCH repetition for various types of services. For example, some wireless communications systems may support PUSCH repetition for ultra-reliable low-latency communication (URLLC) services and enhanced mobile broadband (eMBB) services. A base station may configure a UE with PUSCH repetitions via downlink control information (DCI) signaling, where DCI may schedule the UE with a number of PUSCHs over which a same transport block (TB) may be repeated. However, the number of TBs that a UE may transmit per slot may depend on UE capability (e.g., a UE may be capable of transmitting 2 TBs per slot, 4 TBs per slot, 7 TBs per slot, etc.). Further, UE capability may put a limit on a gap between starting symbols of consecutive PUSCHs.

The techniques described herein may provide for sub-slot based PUSCH repetition (i.e., back-to-back PUSCH repetition within a slot) according to UE capability. As discussed, some UEs may support both eMBB and URLLC per slot, and some UEs may also support PUSCH repetition for eMBB, URLLC, or both. As such, a UE may employ uplink data repetition capability reporting for base station scheduling of uplink data repetition and base station management of the number of TBs that a UE supports on a per-slot basis. According to the techniques described herein, a UE may indicate whether it supports mini-slot repetition (e.g., for URLLC, eMBB, or both) via an uplink data repetition capability report. The uplink data repetition capability report may further indicate a maximum number of PUSCH transmissions per slot for all TBs, a maximum number of supported repetitions per TB, a number of supported TBs per slot, etc., such that a base station may configure or schedule PUSCH repetition based on the UE's reported capability. In some cases, UE capability signaling for PUSCH repetition may be conducted on a per-band basis (e.g., a UE may report PUSCH repetition capability in a given band of a band combination configured for the UE). According to some aspects of the described techniques, PUSCH repetition capability reporting may be performed for different services (e.g., for URLLC and eMBB) separately (e.g., individually) or jointly. Additionally or alternatively, PUSCH repetition capability reporting may be indicated for different channel priorities of PUSCH transmissions (e.g., corresponding to URLLC and eMBB transmissions) separately (e.g., individually) or jointly.

According to other aspects of the described techniques, a minimum gap across PUSCHs may be defined (e.g., to support sub-slot based PUSCH repetition). For example, there may be no gap requirements across PUSCHs that are within a PUSCH repetition bundle, however, gaps across different (e.g., non-repeated) PUSCHs may adhere to the defined gap. The gap may be dependent on configured subcarrier spacing (SCS), minimum processing time capabilities of the UE, etc. As such, UEs may consider the defined gap across non-repeated PUSCH transmissions for UE PUSCH repetition capability signaling, and a base station may schedule UEs in observance of the defined gap across different PUSCH transmissions (e.g., in observance of the defined gap across non-repeated PUSCH transmissions or PUSCH transmissions associated with different repetition bundles).

Aspects of the disclosure are initially described in the context of a wireless communications system. Additionally, aspects of the disclosure are illustrated by an additional wireless communications system, an example transmission scheme, an example PUSCH repetition configuration, and an example process flow. Aspects of the disclosure are further illustrated by and described with reference to apparatus diagrams, system diagrams, and flowcharts that relate to capability signaling for PUSCH repetition.

FIG. 1 illustrates an example of a wireless communications system 100 that supports capability signaling for PUSCH repetition in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), eMBB, or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users. Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $Ts=1/30,720,000$ seconds. Time intervals of a communications resource may be organized according to radio frames each having a duration of 10 milliseconds (ms), where the frame period may be expressed as $Tf=307,200$ Ts. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RB s) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth or may be configurable to support communications over one of a set of carrier bandwidths. In some examples, the wireless communications system 100 may include base stations 105 and/or UEs 115 that support simultaneous communications via carriers associated with more than one different carrier bandwidth. Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some wireless communications systems, one or more UEs 115 may be designed to operate at lower transmit power, in a smaller bandwidth for uplink and downlink communications, with reduced computational complexity, etc. These UEs 115 (e.g., NR-Light, Low-Tier NR UE, etc.) may include smart wearable devices, industrial sensors, video surveillance devices, etc. Accordingly, these UEs 115 may operate using batteries and/or be in continuous operation, such that a reduced transmit power may increase battery life for the UEs 115 and/or provide less drain on power. For example, in some cases, some UEs 115 may operate at an uplink transmit power lower (e.g., at least 10 dB less) than other UEs 115. Additionally, these UEs 115 may use a reduced transmit/receive bandwidth (e.g., 5 MHz bandwidth) for both transmitting and receiving communications with a base station 105.

Wireless communications system 100 may support a first service type (e.g., a first traffic type or a first type of communications) associated with relatively high reliability thresholds and relatively low latency thresholds, such as URLLC. Wireless communications system 100 may also support other service types, associated with relatively low reliability thresholds and relatively long or relaxed latency thresholds, such as eMBB.

Base stations 105 and UEs 115 may support wireless communications according to one or more radio access technologies, such as 4G systems and 5G systems. In some examples, base stations 105 may communicate with UEs 115 on one or more downlink physical channels (for example, such as a physical downlink shared channel (PDSCH), a physical downlink control channel (PDCCH), and the like), while UEs 115 may communicate with base stations 105 on one or more uplink physical channels (for example, such as a PUSCH, a physical uplink control channel (PUCCH), and the like). In some examples, PDSCH may carry downlink data, while PDCCH may carry downlink control signaling (for example, DCI). Similarly, PUSCH may carry uplink data, while PUCCH may carry uplink control signaling (for example, UCI). In some other examples, PUSCH may carry both uplink data, as well as uplink control signaling (for example, UCI).

Base stations 105 may transmit scheduling grants to UEs 115. In some examples, base stations 105 may determine a scheduling grant by scheduling resources (for example, time and frequency resources) for one or more uplink transmissions. In some examples, base stations 105 may allocate a quantity of resource elements or a quantity of resource blocks for one or more uplink transmissions. A resource element may span one symbol by one sub-carrier, while a resource block may span one slot (for example, including multiple symbols by multiple subcarriers (for example, 12 sub-carriers). In the example of an NR system, a slot may span 14 symbols (for example, 14 OFDM symbols).

An uplink transmission may include one or more of a PUSCH or a PUCCH. In some examples, an uplink transmission may include a PUSCH repetition, which may include a number of repeating PUSCH transmissions over a period (for example, a slot). UEs 115 may support repetition of uplink transmissions (for example, such as PUSCH) to improve reliability. In accordance with one or more aspects of the techniques described herein, base stations 105 may configure the number of repetitions for a PUSCH, for example, based on UE PUSCH repetition capability reporting and based on available resources in the wireless communications system 100. In some examples, base stations 105 may be capable of scheduling PUSCH repetitions over a slot. In other examples, base stations 105 may be unable to schedule PUSCH repetitions within the slot. In some examples, PUSCHs of a PUSCH repetition may be scheduled in mini-slots. Here, the PUSCHs of the PUSCH repetition may have different resource allocations, coding rates, and the like. As an example, base stations 105 may schedule two PUSCH repetitions (e.g., two PUSCH repetition bundles) over a slot.

The techniques described herein may provide for sub-slot based PUSCH repetition (i.e., back-to-back PUSCH repetition within a slot) according to UE 115 capability. As discussed, some UEs 115 may support both eMBB and URLLC per slot, and some UEs 115 may also support PUSCH repetition for eMBB, URLLC, or both. As such, a UE 115 may employ uplink data repetition capability reporting for base station 105 management of the number of TBs that a UE 115 supports on a per-slot basis. According to the techniques described herein, a UE 115 may indicate whether it supports mini-slot repetition, a maximum number of supported repetitions per TB, a number of supported TBs per slot, etc. for PUSCH repetition configuration by a base station 105. In some cases, UE 115 capability signaling for PUSCH repetition may be conducted on a per-band basis (e.g., a UE 115 may report PUSCH repetition capability in a given band of a band combination configured for the UE 115). According to some aspects of the described techniques, PUSCH repetition capability reporting may be performed for different services (e.g., for URLLC and eMBB) separately (e.g., individually) or jointly.

The described PUSCH repetition capability signaling may support improvements to reliability of uplink transmissions, among other advantages. For example, PUSCH repetition capability signaling described herein may provide for efficient base station 105 scheduling of PUSCH repetitions for UEs 115 with varying PUSCH repetition capabilities. As such, UEs 115 may support repetition of uplink transmissions, such as PUSCH repetitions, to improve reliability of communications, to increase coverage of uplink transmissions, etc. The described techniques may enable base stations 105 to configure such PUSCH repetitions in accordance with the number of TBs that a UE 115 may transmit per slot, in accordance with UE 115 PUSCH repetition capabilities for different service types (e.g., for URLLC, eMBB, or both), in accordance with UE 115 capabilities for different bands of a configured band combination, etc. The described techniques may enable base stations 105 to configure such PUSCH repetitions in accordance with the number of TBs that a UE 115 may transmit per slot, in accordance with UE 115 PUSCH repetition capabilities for different service types (e.g., for URLLC, eMBB, or both), in accordance with UE 115 capabilities for different bands of a configured band combination, etc.

Figure 2:
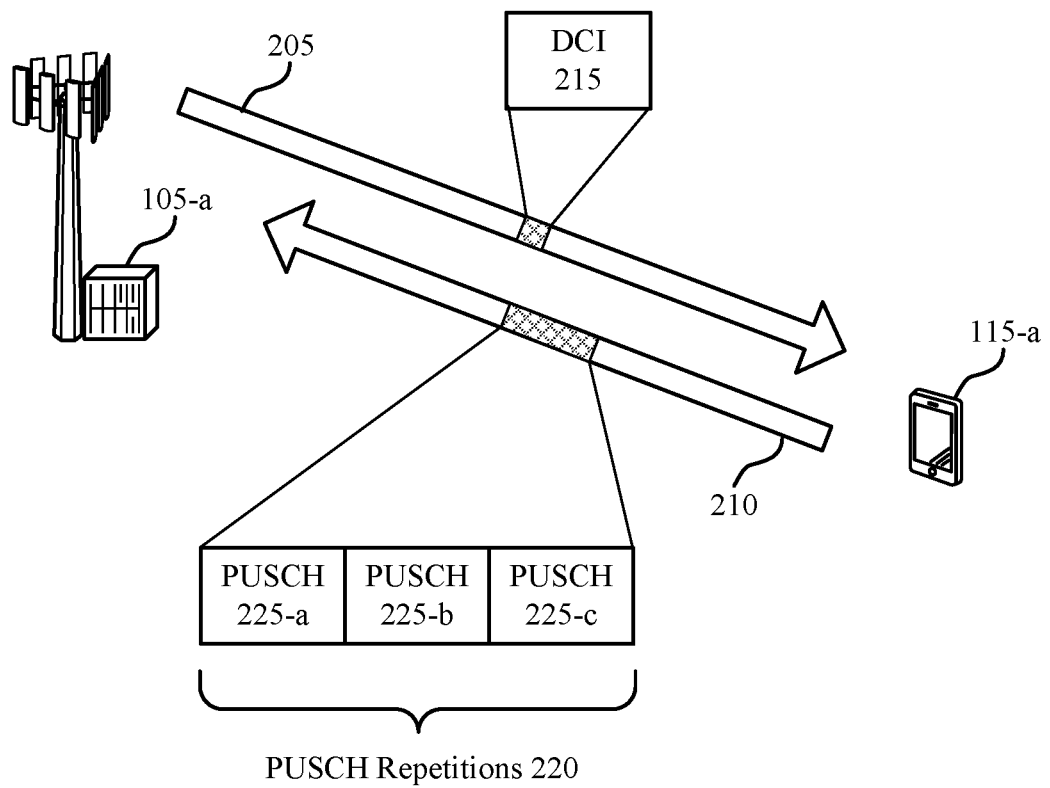
FIG. 2 illustrates an example of a wireless communications system that supports capability signaling for PUSCH repetition in accordance with aspects of the present disclosure.

FIG. 2 illustrates an example of a wireless communications system 200 that supports capability signaling for PUSCH repetition in accordance with aspects of the present disclosure. In some examples, wireless communications system 200 may implement aspects of wireless communications system 100. Wireless communications system 200 may include a base station 105-a and a UE 115-a, which may be examples of corresponding base stations 105 and UEs 115, respectively, as described above with reference to FIG. 1. A base station 105-a may configure (e.g., via an uplink grant included in DCI 215) UE 115-a with PUSCH repetitions 220 to increase the chances that base station 105-a can receive and decode an uplink message from UE 115-a, where the same uplink message is transmitted on each PUSCH 225 of the PUSCH repetitions 220. According to the techniques described herein, base station 105-a may configure PUSCH repetitions 220 in accordance with UE PUSCH repetition capability reporting. As shown, PUSCH repetitions 220 may include three (3) PUSCHs 225 (e.g., PUSCHs 225-a, 225-b, and 225-c).

Base station 105-a may transmit communications to UE 115-a via downlink 205, and UE 115-a may transmit communications to base station 105-a via uplink 210. That is, base station 105-a and UE 115-a may communicate via one or more downlink channels (e.g., PDSCH, PDCCH) and via one or more uplink channels (e.g., PUSCH, PUCCH). In some examples, PDSCH may carry downlink data, while PDCCH may carry downlink control signaling (for example, DCI 215). Similarly, PUSCH may carry uplink data, while PUCCH may carry uplink control signaling. In other examples, PUSCH may carry both uplink data, as well as uplink control signaling (for example, UCI).

Base station 105-a may, in some examples, transmit scheduling grants to UE 115-a. For example, base station 105-a may transmit an uplink grant via DCI 215 to schedule time and frequency resources for one or more uplink transmissions (e.g., for one or more PUSCHs 225). In some examples, base station 105-a may allocate a quantity of resource elements or a quantity of resource blocks for one or more uplink transmissions. A resource element may span one symbol by one sub-carrier, while a resource block may span one slot (e.g., including multiple symbols) by multiple subcarriers (for example, 12 sub-carriers). In the example of the wireless communications system 200, a slot may span 14 OFDM symbols.

In some examples, base station 105-*a* may configure UE 115-*a* to support multiple PUSCH 225 transmissions (also referred to herein as PUSCH repetitions 220). Advantages of PUSCH repetitions 220 may include improvements to uplink transmission reliability (e.g., reliability of an uplink message carried in repeated PUSCHs 225), as well as increase in coverage of uplink transmissions to base station 105-*a*. An uplink transmission by a UE 115-*a* may therefore include a PUSCH repetition 220, which may include a number of repeating PUSCH 225 transmissions over a temporal period (e.g., over a slot). In some examples, base station 105-*a* may configure a number of repetitions (e.g., three repetitions) for PUSCH 225 within a slot. By way of example, UE 115-*a* may support a PUSCH repetition 220, which may include a PUSCH 225-*a*, a PUSCH 225-*b*, and a PUSCH 225-*c*. As described herein, PUSCH repetitions 220 may improve the chance that at least part of the PUSCH 225 payloads in the PUSCH repetitions 220 may be successfully received and decoded by base station 105-*a*. In some examples, one or more integrated circuits (e.g., transceivers, processors, etc.) of UE 115-*a* may implement techniques for improving uplink transmission reliability discussed herein to improve overall wireless communications with base station 105-*a* and reduce overall power consumption for the UE 115-*a*

Wireless communications system 200 may support PUSCH repetition 220 for URLLC. DCI 215 may schedule a number of PUSCHs 225 over which a same TB is repeated. Wireless communications system 200 may further support PUSCH repetition 220 for both URLLC and eMBB services. In cases where URLLC (e.g., high priority channels) and eMBB (e.g., relatively lower priority channels) are differentiable at the PHY layer, PUSCH repetition 220 may be supported for either URLLC or eMBB, or PUSCH repetition 220 may be supported for both. For example, uplink DCI 215 scheduling URLLC may schedule PUSCH repetition 220 (e.g., for repetitions of PUSCH 225 carrying a repeated URLLC message), and uplink DCI 215 scheduling eMBB may separately schedule PUSCH repetition 220 (e.g., for repetitions of PUSCH 225 carrying a repeated eMBB message). For example, for uplink grant-free, different configuration may be indicated to the UE 115-*a* for low and high priority PUSCH 225 Tx with transmission (e.g., different configuration may be indicated to the UE 115-*a* for low and high priority PUSCH 225 repetition). If URLLC and eMBB are non-differentiable (e.g., if URLLC and eMBB are transparent at the PHY layer, or more specifically if the same DCI 215 is used for both URLLC and eMBB), then the UE 115-*a* may be configured to support PUSCH repetition 220 or the UE 115-*a* may be configured to not support PUSCH repetition 220 (e.g., UE 115-*a* may be configured to support PUSCH repetition 220 for both URLLC and eMBB based on UE 115-*a* PUSCH repetition capability reporting).

For example, the number of TBs that UE 115-*a* can transmit per slot may be limited as a capability of the UE 115-*a* (e.g., a UE 115-*a* may be capable of transmitting 2 TBs per slot, 4 TBs per slot, 7 TBs per slot, etc.). Further, another capability may be defined which may put a restriction on the gap between starting symbols of consecutive PUSCHs. In some cases, such gap restrictions may be established to facilitate UE implementation.

In some wireless communications systems, PUSCH repetition 220 may be supported, however each PUSCH 225 within a repetition bundle (e.g., within a PUSCH repetition 220 configured by a base station) may be in a different slot. However some wireless communications systems (e.g., such as wireless communications system 200) may support PUSCH repetition 220 where PUSCHs 225 associated with a repetition bundle may be back-to-back and present within a same slot (e.g., PUSCH repetition 220 may be configured within a single slot). As such, new UE PUSCH repetition capability signaling may be employed (e.g., as otherwise, if a number of TBs per slot capabilities are reported, all PUSCHs 225 within a same bundle may be counted as one TB, since the PUSCHs 225 are carrying the same TB). However, preparing each PUSCH in a repetition bundle (e.g., in PUSCH repetition 220) may impose the same burden as generating a new TB on the UE (e.g., it may be desirable for the UE 115-*a* to report capabilities pertaining to TB generation within a slot in addition to repetition capabilities within a slot). Further, as discussed herein, UE 115-*a* may support both eMBB and URLLC per slot, and UE 115-*a* may support PUSCH repetition 220 for eMBB, URLLC, or both. As such, the techniques described herein may provide for UE uplink data repetition capability reporting to manage the number of TBs that a UE 115 supports on a per-slot basis.

For example, in some cases (e.g., for transparent service type scenarios where same DCI 215 is used for eMBB and URLLC), the service type (e.g., the eMBB service type or URLLC service type) may be transparent to the PHY layer (e.g., no priority indication may be adopted). In other cases (e.g., for non-transparent service type scenarios) uplink of eMBB and URLLC (e.g., high priority PUSCH 225 and low priority PUSCH 225) may be differentiable at the PHY layer. According to the techniques described herein, wireless communications system 200 may support sub-slot based PUSCH repetition 220 (e.g., back-to-back PUSCH repetition 220) based on UE 115-*a* capability. Per each band in a band combination (e.g., per-band of a band combination (BoBC)), UE 115-*a* may indicate whether it supports PUSCH repetition 220 or whether UE 115-*a* does not support PUSCH repetition 220. In non-transparent service type scenarios, the support (e.g., UE capability) for PUSCH repetition 220 for high priority PUSCH 225 and low priority PUSCH 225 may be separately reported. Hence, the configuration of PUSCH repetition 220 may also be separated (e.g., DCI 215 scheduling PUSCH repetition 220 for URLLC PUSCH 225 may be separate from DCI 215 scheduling PUSCH repetition 220 for eMBB PUSCH 225).

For both transparent service type scenarios and non-transparent type scenarios, one way to limit the number of TBs (e.g., according to the UEs capability), while taking the PUSCH repetition into account, is to limit the number of PUSCHs 225 per slot (e.g., in addition to or instead of the number of TBs per slot). For example, UE uplink data repetition capability reporting may include an indication of a number of PUSCHs 225 (e.g., whether repeated PUSCH 225 or non-repeated PUSCH 225) are supported per slot. That is, each repeated PUSCH 225 may be counted as one PUSCH transmission. In some cases, a maximum number of PUSCHs 225 per slot for all TBs permitted in that particular slot may be provided by UE uplink data repetition capability reporting. For non-transparent service type scenarios, the number of PUSCHs 225 supported per slot may be reported jointly or separately for URLLC and eMBB. In some cases, a maximum number of PUSCHs 225 per slot may reported for a first UE 115-*a* capability (e.g., a first processing capability of UE 115-*a*) and a maximum number of PUSCHs 225 per slot may separately reported for a second UE 115-*a* capability (e.g., second processing capability of UE 115-*a*), for example, if UE 115-*a* supports multiple processing capabilities.

In other examples, per BoBC, UE 115-*a* may report whether it supports mini-slot based repetition (e.g., uplink data repetition capability reporting may include an indication of whether the UE 115-*a* is capable of mini-slot based PUSCH repetition 220). The UE 115-*a* may also report the number of TBs supported per slot.

For example, for transparent service type scenarios, uplink data repetition capability reporting may include an indication of whether the UE 115-*a* supports mini-slot repetition, an indication of a maximum number of supported repetitions per TB, and a number of TBs supported per slot. For example, in a given BoBC, UE 115-*a* may indicate that it supports mini-slot repetition with two repetitions per repetition bundle (e.g., two PUSCHs 225 per PUSCH repetition 220), and with four TBs per slot. In some cases, the UE 115-*a* may report different values (e.g., different uplink data repetition capabilities) per BoBC. As such, in such an example, even if each repetition (e.g., each PUSCH 225) consumes one new TB worth of processing at the UE 115-*a*, the UE 115-*a* may not need to process more than eight TBs per slot.

For non-transparent service type scenarios, UE 115-*a* may indicate the same parameters (e.g., an indication of whether the UE 115-*a* supports mini-slot repetition, an indication of a maximum number of supported repetitions per TB, and a number of TBs supported per slot), but the repetition capability parameters may be indicated across eMBB and URLLC jointly. For example, UE 115-*a* may report, in a given BoBC, that it does support repetition for eMBB, that it supports repetition for URLLC, and that it supports a maximum of 3 repetitions per window. In this case, the UE may support 2 TB for eMBB and 2 TB for URLLC. As such, overall, the UE 115-*a* may not need to perform more than eight TBs worth of processing per slot. Alternatively, the UE 115-*a* may report one value for the number of TBs for eMBB and URLLC (e.g., the UE 115-*a* may report a capability to support four TBs per slot). If all four TBs are for URLLC, and if repeated, then the UE 115-*a* may not work on more than 8 TBs per slot. If some TBs are for eMBB, then the TBs for eMBB may not be repeated. Hence, the total number of TBs worth of processing per slot may be even less than 8.

Additionally or alternatively, a minimum gap across PUSCHs may be defined. Such a gap may be used in the same way for transparent service type scenarios and non-transparent service type scenarios, or the gap may be implemented under non-transparent service type scenarios such that the gap only applies across PUSCHs of the same priority. For example, there may be no gap defined across PUSCHs (e.g., repeated PUSCHs 225) that are within one repetition bundle. The gap between non-repeated PUSCHs (e.g., the gap between PUSCHs carrying different messages) may be configured based on SCS, and may further depend on minimum processing time capabilities of the UE (e.g., different gaps between the starting symbol of two consecutive PUSCHs for cap #1 and cap #2). For example, the UE 115-*a* may report that for a SCS=30 KHz and a cap #2 the UE 115-*a* uses a 2 symbol gap between PUSCHs 225 carrying different messages (e.g., between non-repeated PUSCHs or between PUSCHs 225 of different repetition bundles). The UE 115-*a* may also report the number of TBs supported per slot (e.g., the UE 115-*a* may report the number of TBs supported per slot jointly for transparent service type scenarios or the UE 115-*a* may report the number of TBs supported per slot separately for non-transparent service type scenarios). In some cases, wireless communications system 200 (e.g., base station 105-*a*) may configure communications such that the length of each PUSCH 225 in a repetition bundle may be 2 or more symbols. An example PUSCH repetition scheme implementing such an example described above is described in more detail herein, for example, with reference to FIG. 4.

Figure 3:
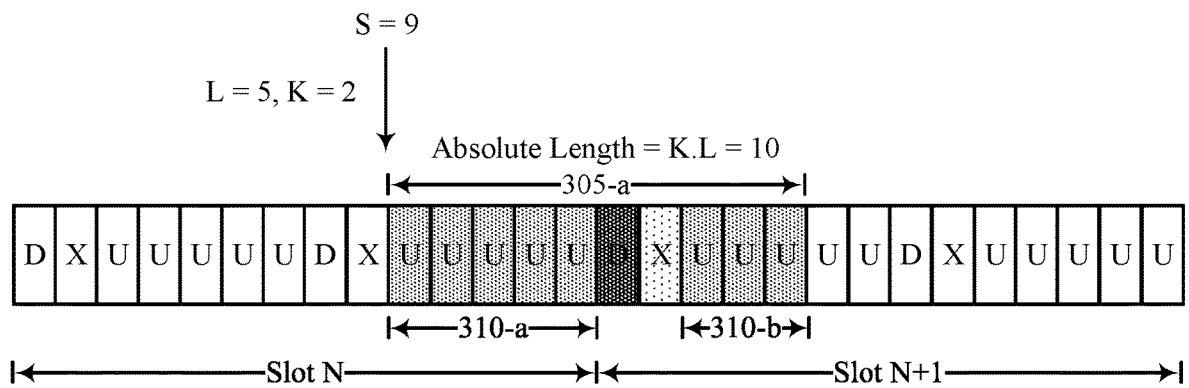
FIG. 3 illustrates an example of a transmission scheme that supports capability signaling for PUSCH repetition in accordance with aspects of the present disclosure.

FIG. 3 illustrates an example of a transmission scheme 300 that supports capability signaling for PUSCH repetition in accordance with aspects of the present disclosure. In some examples, transmission scheme 300 may implement aspects of wireless communications system 100 and/or wireless communications system 200. For example, transmission scheme 300 may be implemented by a UE as part of a time domain resource determination for PUSCH repetition. In some examples, the time domain resource determination may include determining a starting symbol and transmission duration associated with a PUSCH repetition configuration.

In order to improve latency in communication (e.g., for mission critical applications that may include URLLC), a UE may support one or more data repetitions for transmitting the uplink data payload. The UE may determine a repetition length for the one or more data repetitions based on a duration between the starting symbol and the transmission duration. In some cases, the starting symbol and a transmission duration for the one or more data repetitions may be indicated in the form of a start and length indicator value (SLIV) from a base station. For example, the UE may schedule one or more PUSCH repetitions within a slot based on an uplink grant including a SLIV (e.g., which may be configure or schedule mini-slot repetition). In other examples, the UE may schedule a single repetition for each of the consecutive slots, unless a slot is formatted to include multiple distinct uplink symbol periods (e.g., which may be called multi-segment repetition).

As described herein, the UE may support identifying a starting symbol and a transmission duration (e.g., for the one or more data repetitions) associated with the indicated time domain resource assignment. The starting symbol and transmission duration may indicate a configuration for performing uplink transmission over one or more data repetitions that span a slot or, in some cases, over one or more data repetitions that span consecutive slots. For example, the UE may determine a starting symbol and a transmission duration that spans a contiguous set of uplink symbols within a slot or within consecutive slots (e.g., the transmission duration may correspond to a total number of symbols used for one or more repetitions of the transmission). In other examples, the UE may determine a starting symbol and a transmission duration that spans a number of uplink symbols within the slot (e.g., the transmission duration may correspond to a number of uplink symbols, which may not be contiguous).

The UE may identify directions for the one or more symbols as part of a slot format. For example, each of the slots may include uplink symbols, downlink symbols, and flexible symbols for communicating data traffic. In some examples, the UE may receive a semi-static slot format indication (e.g., that identifies slot formats for each slot of each frame).

As discussed herein, a UE may receive signaling (e.g., DCI) that includes an uplink grant and a time domain resource assignment for transmitting one or more data repetitions of uplink data. In some cases, the DCI signaling may indicate a starting symbol and a transmission duration for one or more uplink data repetitions. In some examples, the time domain resource assignment may include an index value for a table configured according to RRC signaling. In some cases, the index value may correspond to a SLIV that includes a starting symbol and a transmission duration for the one or more data repetitions. The UE may identify directions for a plurality of symbols spanning the transmission duration, including symbols within a first slot and symbols within a second slot. The directions may include uplink symbols, flexible symbols, and downlink symbols associated with a slot format. Based on the identified directions for the plurality of symbols, the UE may determine a subset of the plurality of symbols for scheduling the one or more data repetitions and performing uplink signaling on the channel.

In some examples, as shown in FIG. 3, a UE may receive a time domain resource assignment (e.g., as part of DCI) and identify a SLIV value, which may indicate a starting symbol (for example, symbol index nine (9) of slot N, as shown) and transmission duration 305-a, such as a number of slots, for an uplink transmission. For example, the UE may determine, from the starting symbol, an absolute number of symbols corresponding to transmission duration 305-a, including uplink symbols (U), downlink symbols (D), and flexible symbols (X) for the one or more consecutive slots. The transmission duration 305-a may correspond to contiguous symbols (for example, uplink symbols, downlink symbols, and flexible symbols) within each of slots N and N+1. The UE may determine one or more data repetitions 310 in each slot. For example, when using multi-segment transmission, the UE may schedule a first data repetition 310-a for the uplink data payload over a contiguous set of uplink symbols for slot N. Additionally, the UE may schedule a second data repetition 310-b for the uplink data payload over a contiguous set of uplink symbols for slot N+1. Alternatively, when using mini-slot repetition, the UE may schedule one or multiple data repetitions 310 within each slot (for example, two repetitions 310 in each slot). In some cases, the indicated transmission duration 305-a may thus correspond to a single slot (e.g., PUSCH repetitions may be configured via an indicated starting symbol and transmission duration 305-a scheduling PUSCH repetitions within a single slot, according to UE uplink data repetition capability reporting). For example, a mini-slot duration may be determined to be two or three symbols, and data repetition 310-a may include two repetitions of two or three symbols each, and data repetition 310-b may include an additional two repetitions of two symbols each. In some examples, the mini-slot duration may be determined by a number of symbols between the starting symbol and a last symbol in the first slot N. For example, the mini-slot duration may depend on the number of symbols between the starting symbol and a last symbol in the first slot N, a transport block size of data to be transmitted in the data repetitions 310, and a maximum coding rate.

Generally, a UE may receive an indication of one or more data repetitions associated with an uplink data payload. For example, the UE may receive a grant (e.g., such as DCI, or a dynamic grant) which may include information about a transmission scheme. For example, the grant may include information such as a starting symbol location (e.g., a symbol index S), the length of each data repetition L (given by a number of symbols included in each data repetition), and the number of data repetitions K that may occur during the transmission. In accordance with the techniques described herein, such configuration or scheduling (e.g., by a base station) of one or more data repetitions associated with an uplink data payload may be in accordance with UE uplink data repetition capability reporting. For example, in some cases, UE uplink data repetition capability reporting may include parameters or information indicative of combinations of L and K, or maximum values of L and K, that the UE is capable of supporting (e.g., within a slot). In other words, a base station may receive UE uplink data repetition capability reporting from a UE, and the base station may configure or schedule the UE with one or more data repetitions associated with an uplink data payload in accordance with the UEs capability. For example, a grant may include a symbol index S, the length of each data repetition L, and the number of data repetitions K to configure one or more data repetitions (e.g., within a slot) associated with an uplink data payload that is in compliance with UE uplink data repetition capability reporting (e.g., with UE reported maximum number of supported repetitions per TB, number of supported TBs per slot, service types supporting uplink data repetition, BoBC that support uplink data repetition, etc.).

In some cases, the UE may perform segmentation for repetitions that cross a slot boundary, and may skip performing segmentation for repetitions that do not cross a slot boundary. The techniques described herein may apply to scenarios where repetitions occur within a same slot, to scenarios where repetitions cross a slot boundary, etc.

Figure 4:
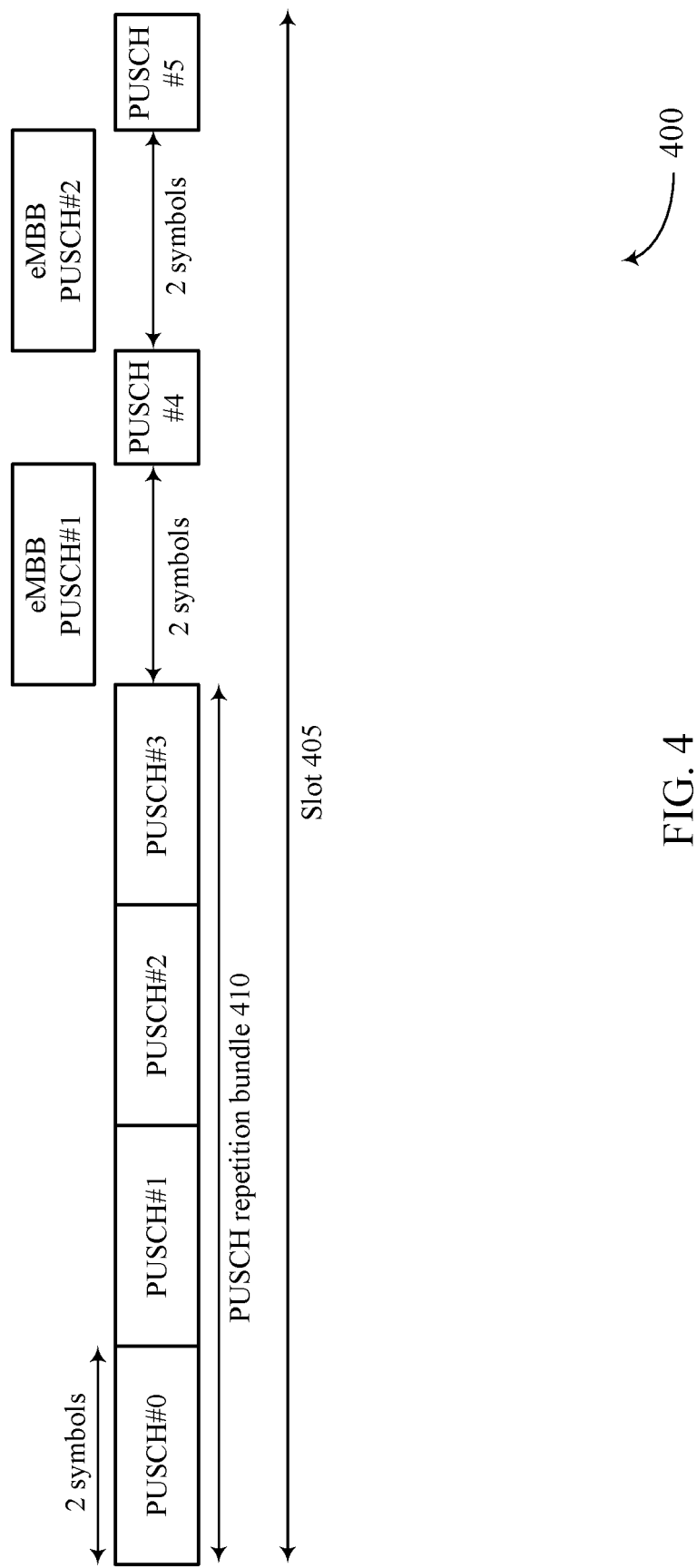
FIG. 4 illustrates an example of a PUSCH repetition configuration that supports capability signaling for PUSCH repetition in accordance with aspects of the present disclosure.

FIG. 4 illustrates an example of a PUSCH repetition configuration 400 that supports capability signaling for PUSCH repetition in accordance with aspects of the present disclosure. In some examples, PUSCH repetition configuration 400 may implement aspects of wireless communications system 100 and/or wireless communications system 200. As described herein, a UE 115 may be configured or scheduled for one or more uplink data repetitions (e.g., according to PUSCH repetition configuration 400) in accordance with UE uplink data repetition capability (e.g., in accordance with UE uplink data repetition capability reporting). The example PUSCH repetition configuration 400 may illustrate an example where PUSCH repetition bundle 410 (e.g., which may be an example of PUSCH repetitions 220, as described with reference to FIG. 2) is configured or scheduled within a slot 405. According to the techniques described herein, a UE may transmit an uplink data repetition capability report to a base station, where the uplink data repetition capability report may include an indication of a number of data repetitions supported per transport block (e.g., a number of PUSCH supported per PUSCH repetition bundle 410), a number of transport blocks supported per slot 405, etc.

As discussed herein, in some examples, a minimum gap across PUSCHs (e.g., non-repeated/non-bundle-consecutive PUSCHs) may be defined. Such a gap may be used in the same way for transparent service type scenarios and non-transparent service type scenarios, or the gap may be implemented under non-transparent service type scenarios such that the gap only applies across PUSCHs of the same priority. For example, there may be no gap defined across PUSCHs (e.g., repeated PUSCHs 225) that are within one repetition bundle 410 (e.g., there may be no gap defined between PUSCH #0, PUSCH #1, PUSCH #2, and PUSCH #3). The gap between non-repeated PUSCHs (e.g., the gap between PUSCHs carrying different messages, such as between PUSCH #3 and PUSCH #4, such as between PUSCH #4 and PUSCH #5) may be configured based on SCS, and may further depend on minimum processing time capabilities of the UE (e.g., different gaps between the starting symbol of two consecutive PUSCHs for cap #1 and cap #2).

For example, a UE may report that for a SCS=30 KHz and a cap #2 the UE uses a 2 symbol gap between PUSCHs carrying different messages (e.g., between non-repeated PUSCHs or between PUSCHs of different repetition bundles, such as between PUSCH #3 and PUSCH #4, such as between PUSCH #4 and PUSCH #5). The UE may also report the number of TBs supported per slot 405 (e.g., the UE may report the number of TBs supported per slot 405 jointly for transparent service type scenarios, or the UE may report the number of TBs supported per slot 405 separately for non-transparent service type scenarios). In some cases, a wireless communications system (e.g., a base station) may configure communications such that the length of each PUSCH in a repetition bundle 410 may be 2 or more symbols (e.g., in some cases, the length of each of PUSCH #0, PUSCH #1, PUSCH #2, and PUSCH #3 may be at least 2 symbols).

For example, a UE may support seven TBs per slot 405 for URLLC and two TBs per slot 405 for eMBB. However, because the UE supports repetition (e.g., because the UE indicates it support repetition in uplink data repetition capability reporting), the UE may report a smaller value for supported TBs per slot 405 (e.g., to take into account uplink data repetition and resulting TBs worth of processing for the UE). For example, the UE may indicate that it supports four TBs per slot 405 for URLLC (e.g., the UE may determine it supports four TBs per slot 405 for URLLC and repetition for URLLC, or seven TBs per slot 405 with no repetition). In such an example, the base station may schedule the UE according to example PUSCH repetition configuration 400 (e.g., where PUSCH #0-5 may illustrate URLLC PUSCH and eMBB PUSCH #1-2 may illustrate eMBB PUSCH). As shown in example PUSCH repetition configuration 400, for URLLC, the UE may handle six TBs (e.g., PUSCH #0, PUSCH #1, PUSCH #2, PUSCH #3, PUSCH #4, and PUSCH #5), which the UE may be capable of since the UE can support up to seven TBs. The base station may schedule three TBs (e.g., a TB associated with repetition bundle 410, a TB associated with PUSCH #4, and a TB associated with PUSCH #5), which may also be supported, because the UE has indicated it supports up to four TBs per slot 405 (e.g., for URLLC).

In the example of FIG. 4, the eMBB and URLLC PUSCHs may be shown as non-overlapping. In other examples, eMBB and URLLC PUSCHs may overlap, in which case some of the PUSCHs may be dropped (e.g., the lower priority PUSCHs, such as eMBB PUSCHs that overlap with URLLC PUSCHs, may be dropped). However, if a PUSCH is dropped, the PUSCH may still be counted as one TB in that given slot (e.g., a dropped PUSCH may still be counted in terms of UE uplink data repetition capability reporting, in terms of base station scheduling in accordance with UE uplink data repetition capability reporting, etc.). Repetition for eMBB may also be employed (e.g., eMBB repetition may be supported and indicated in UE uplink data repetition capability reporting, and eMBB repetition may be scheduled or configured by a base station accordingly). In cases where eMBB repetition is supported, a separate gap may be defined and employed across PUSCHs of eMBB in different bundles (e.g., analogous to the 2 symbol gap between non-repeated URLLC PUSCH described in the example of FIG. 4).

Figure 5:
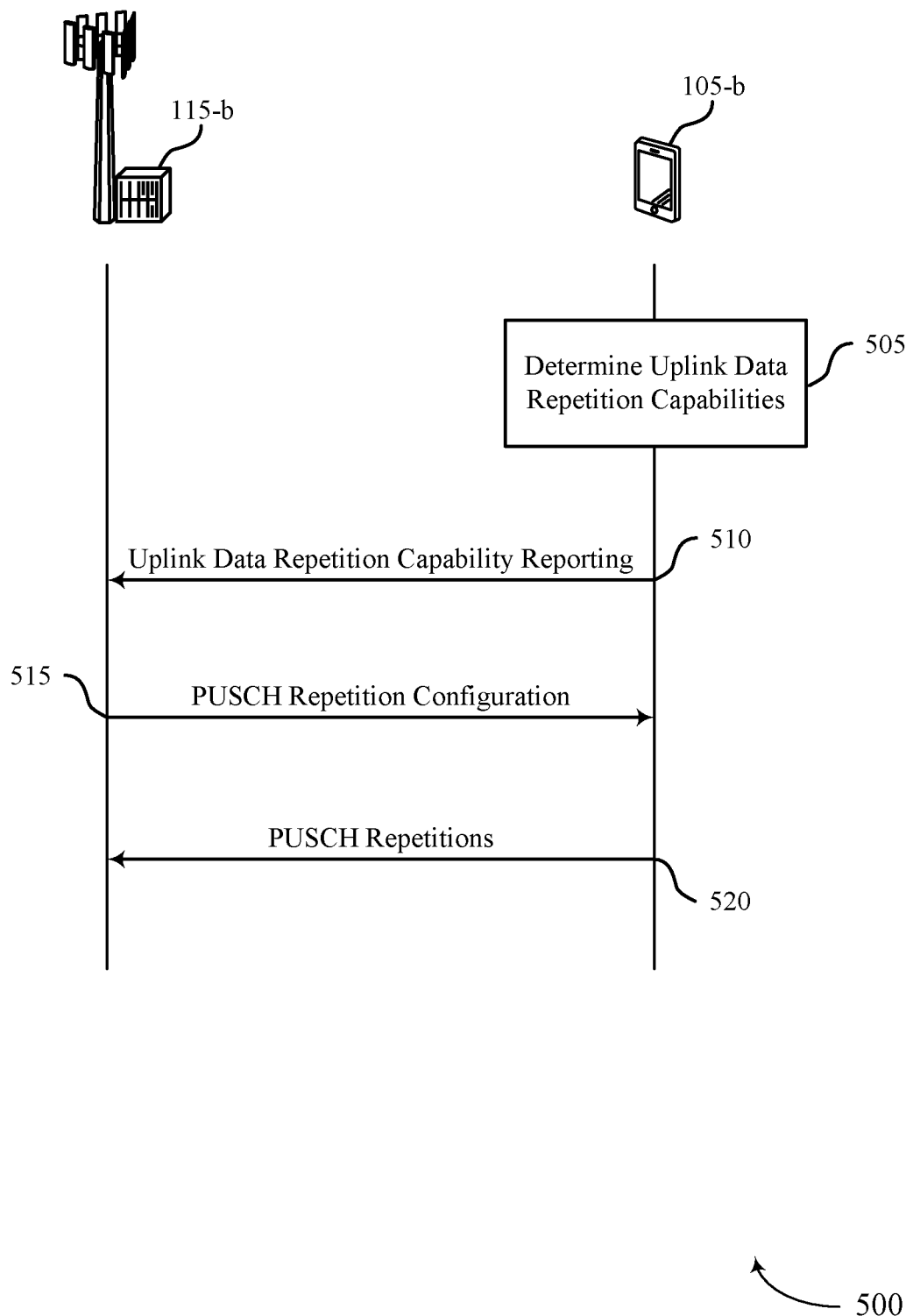
FIG. 5 illustrates an example of a process flow that supports capability signaling for PUSCH repetition in accordance with aspects of the present disclosure.

FIG. 5 illustrates an example of a process flow 500 that supports capability signaling for PUSCH repetition in accordance with aspects of the present disclosure. In some examples, process flow 500 may implement aspects of wireless communications system 100 and/or wireless communications system 200. Process flow 500 may include a base station 105-b and a UE 115-b, which may be examples of corresponding base stations 105 and UEs 115, as described above with reference to FIGS. 1-4. In the following description of the process flow 500, the operations between UE 115-b and base station 105-b may be transmitted in a different order than the order shown, or the operations performed by base station 105-b and UE 115-b may be performed in different orders or at different times. Certain operations may also be left out of the process flow 500, or other operations may be added to the process flow 500. It is to be understood that while base station 105-b and UE 115-b are shown performing a number of the operations of process flow 500, any wireless device may perform the operations shown.

At 505, UE 115-b may determine uplink data repetition capabilities (e.g., according to the various techniques described herein). For example, UE 115-b may identify one or more bands of a configured band combination and determine the uplink data repetition capability report based on a first band of the one or more bands (e.g., UE 115-b may identify uplink data repetition capabilities per BoBC). In some cases, an indication that uplink data repetition is supported in the first band may be included in the uplink data repetition capability report (e.g., in some cases, the uplink data repetition capability report may indicate uplink data repetition capabilities per BoBC). In some cases, the uplink data repetition capability report may indicate uplink data repetition capabilities per-BoBC. In other cases, an uplink data repetition capability report may be transmitted for each BoBC (e.g., a first uplink data repetition capability report may be transmitted for a first BoBC and a second uplink data repetition capability report may be transmitted for a second BoBC).

In some examples, UE 115-b may identify a first configured service type, and the uplink data repetition capability report may be determined based on the first configured service type. In some cases, the uplink data repetition capability report may include an indication of the first service type. For example, as described herein, based on whether or not the service type is transparent (e.g., at the PHY layer), uplink data repetition capabilities may be reported separately (e.g., individually) or jointly for different service types (e.g., for URLLC and eMBB). As such, in cases where uplink data repetition capabilities may be reported separately for different service types, the uplink data repetition capabilities may be reported per-service type (e.g., such that the uplink data repetition capability report may include an indication of whether uplink repetition is supported for a service type, an indication of how many repetitions, TBs, etc. are supported within a slot for a service type, etc.). In some cases, the uplink data repetition capability report may indicate uplink data repetition capabilities per-service type. In other cases, an uplink data repetition capability report may be transmitted for each service type (e.g., a first uplink data repetition capability report may be transmitted for a first service type and a second uplink data repetition capability report may be transmitted for a second service type).

In some examples, the uplink data repetition capability report may include an indication of whether the UE 115-b supports uplink data repetition for the first configured service type, an indication of whether the UE 115-b supports uplink data repetition for the second configured service type, an indication of a number of TBs supported per slot for the first service type, an indication of a number of TBs supported per slot for the second service type, or some combination thereof. In other examples, the UE 115-b may determine a number of TBs supported per slot based on consideration of the first configured service type and the second configured service type, and the number of TBs supported per slot may be reported jointly for both service types. That is, the reported number of TBs supported per slot may take into account both service types supported by the UE 115-b, or the UE 115-b may report the number of TBs supported per slot for a first service type and the number of TBs supported per slot for a second service type. As discussed herein, in some cases, the first service type may refer to an eMBB service type and the second service type may refer to a URLLC service type.

In some examples, as discussed herein, UE 115-b may determine a gap between non-repeated uplink data transmissions (e.g., a gap between non-repeated PUSCHs, between PUSCHs associated with different repetition bundles, etc.). In such examples, the UE 115-b may determine uplink data repetition capabilities based on the gap (e.g., the UE 115-b may take into account processing ramifications of the gap when reporting uplink data repetition capabilities to base station 105-b). For example, in some cases, UE 115-b may determine a number of TBs supported per slot (assuming the gap) based on reducing a second number of TBs supported per slot (not assuming the gap) (e.g., according to the gap, UE 115-b may adjust a number of non-repeated uplink data transmissions supported per slot to account for uplink data repetitions and gaps between non-repeater uplink data transmissions). In some cases, the uplink data repetition capability report may include an indication of the gap. In some cases, the uplink data repetition capability report may include an indication of a minimum length of each repetition bundle comprising data repetitions. In some cases, the gap is determined based on a configured SCS and/or one or more processing capabilities of the UE 115-b. In other words, UE 115-b may adjust the number of TBs supported per slot based on the gap (e.g., based on SCS, processing capabilities of UE 115-b, etc.). In some cases, gaps may separately (e.g., individually) defined across PUSCHs of URLLC and eMBB (e.g., in different bundles).

At 510, UE 115-b may transmit an uplink data repetition capability report to a base station (e.g., based on the uplink data repetition capabilities of the UE 115-b, determined at 505). In some examples, the uplink data repetition capability report may include indication of a number of PUSCHs supported per slot (e.g., the uplink data repetition capability report may indicate a number of PUSCH supported per slot, such that base station 105-b may schedule PUSCH repetitions and/or non-repeated PUSCH in a slot according to the number of total PUSCH supported per slot). That is, in some cases, the uplink data repetition capability report may indicate a total number of PUSCHs supported per slot (e.g., based on TB processing capabilities of the UE 115-b), such that each PUSCH, whether part of a repetition bundle or whether as a non-repeated PUSCH, is counted individually for base station 105-b scheduling.

In some examples, the uplink data repetition capability report may include at least an indication of a number of data repetitions supported per TB and a number of TBs supported per slot. For example, the uplink data repetition capability report may indicate how many PUSCHs may be repeated per repetition bundle (e.g., which may be counted by the base station as a TB), as well as how many TBs the UE 115-b supports per slot. As discussed herein, the uplink data repetition capabilities may be reported jointly or separately for different bands of a configured band combination (e.g., jointly or separately for each BoBC), may be reported jointly or separately for different service types (e.g., jointly or separately for URLLC and eMBB), etc.

At 515, UE 115-b may receive, from base station 105-b, signaling comprising an uplink grant for one or more data repetitions based on the transmitted uplink data repetition capability report. For example, UE 115-b may receive DCI including an uplink grant for various scheduling or configuration of one or more data repetitions (e.g., PUSCH repetitions), in accordance with uplink data repetition capability reporting by the UE 115-b. At 520, UE 115-b may transmit, to base station 105-b, the one or more data repetitions (e.g., PUSCH repetitions) according to the uplink grant.

Figure 6:
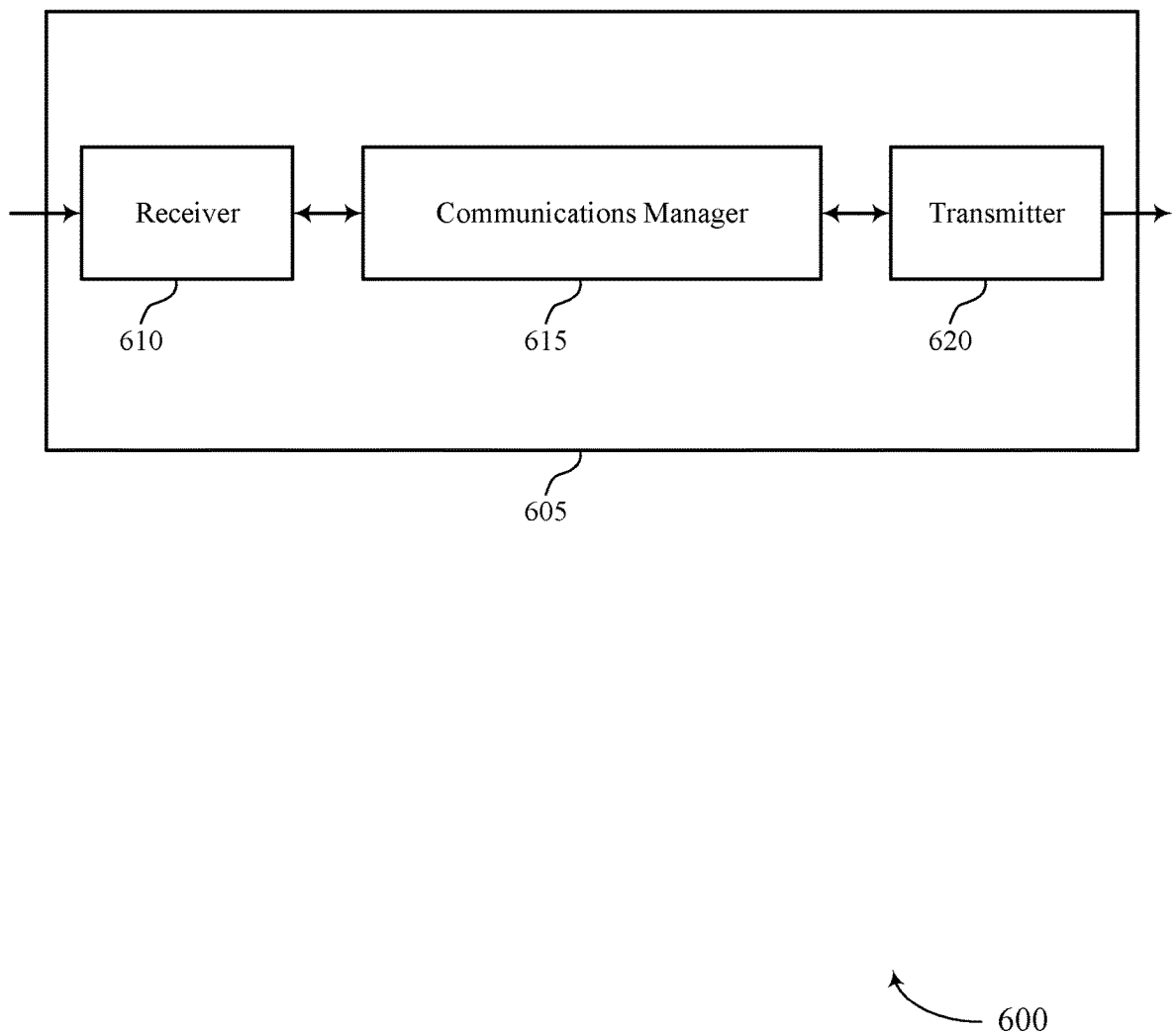
FIGS. 6 and 7 show block diagrams of devices that support capability signaling for PUSCH repetition in accordance with aspects of the present disclosure.

FIG. 6 shows a block diagram 600 of a device 605 that supports capability signaling for PUSCH repetition in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to capability signaling for PUSCH repetition, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may transmit an uplink data repetition capability report to a base station, where the uplink data repetition capability report includes at least an indication of a number of data repetitions supported per transport block and a number of transport blocks supported per slot, receive, from a base station, signaling including an uplink grant for one or more data repetitions based on the transmitted uplink data repetition capability report, and transmit, to the base station, the one or more data repetitions based on the uplink grant.

In some examples, the communications manager 615 may transmit an uplink data repetition capability report to a base station, where the uplink data repetition capability report includes an indication of a number of PUSCH transmissions supported per slot, the number of PUSCH transmissions being associated with a number of PUSCH and a number of transport blocks supported per slot, receive, from a base station, signaling including an uplink grant for one or more PUSCH repetitions based on the transmitted uplink data repetition capability report, and transmit, to the base station, the one or more PUSCH repetitions based on the uplink grant. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
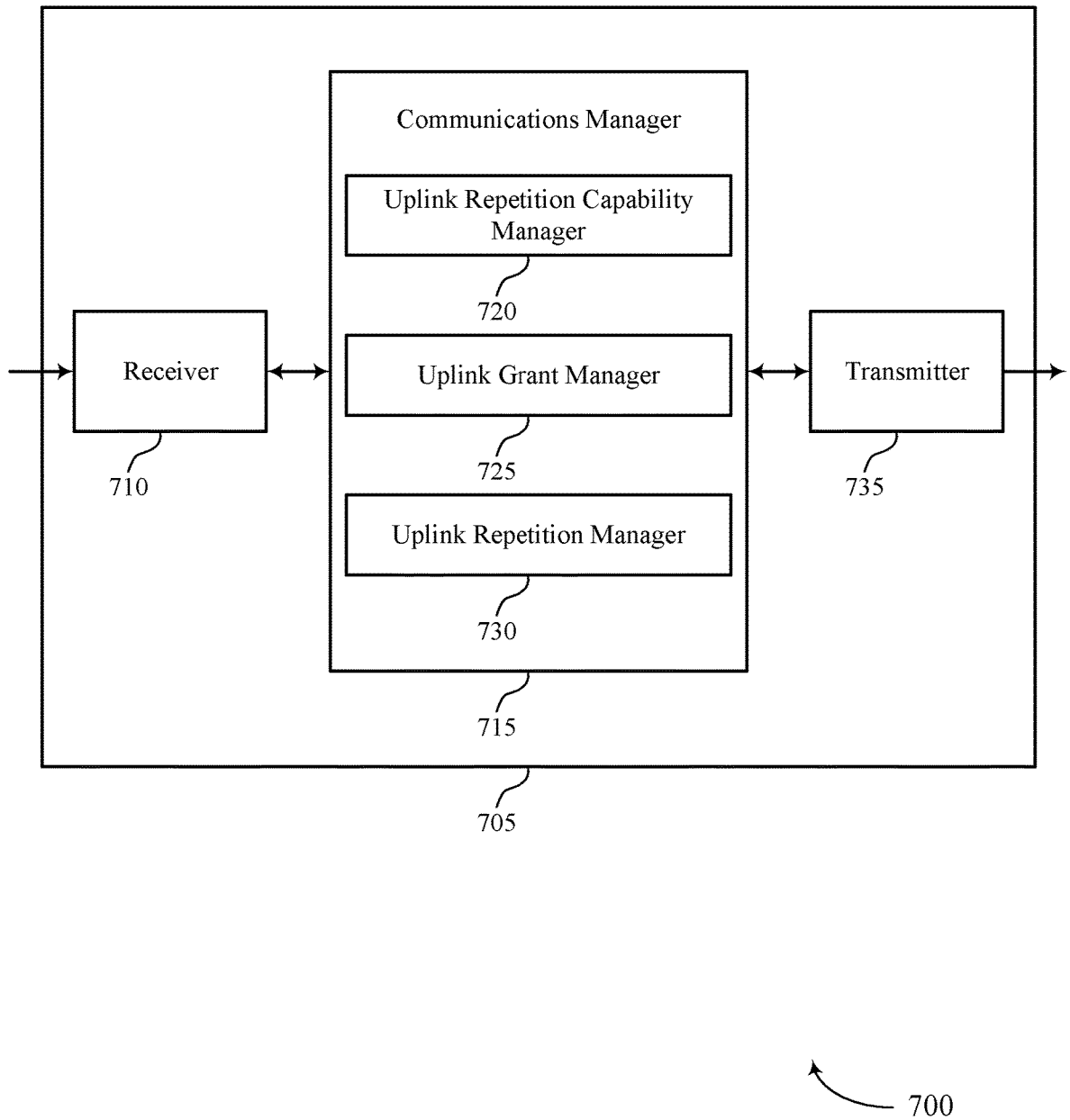

FIG. 7 shows a block diagram 700 of a device 705 that supports capability signaling for PUSCH repetition in accordance with aspects of the present disclosure. The device 705 may be an example of aspects of a device 605, or a UE 115 as described herein. The device 705 may include a receiver 710, a communications manager 715, and a transmitter 735. The device 705 may also include a processor. Each of these components may be in communication with one another (e.g., via one or more buses).

The receiver 710 may receive information such as packets, user data, or control information associated with various information channels (e.g., control channels, data channels, and information related to capability signaling for PUSCH repetition, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include an uplink repetition capability manager 720, an uplink grant manager 725, and an uplink repetition manager 730. The communications manager 715 may be an example of aspects of the communications manager 910 described herein.

The uplink repetition capability manager 720 may transmit an uplink data repetition capability report to a base station, where the uplink data repetition capability report includes at least an indication of a number of data repetitions supported per transport block and a number of transport blocks supported per slot. The uplink grant manager 725 may receive, from a base station, signaling including an uplink grant for one or more data repetitions based on the transmitted uplink data repetition capability report. The uplink repetition manager 730 may transmit, to the base station, the one or more data repetitions based on the uplink grant.

In some examples, the uplink repetition capability manager 720 may transmit an uplink data repetition capability report to a base station, where the uplink data repetition capability report includes an indication of a number of PUSCH transmissions supported per slot, the number of PUSCH transmissions being associated with a number of PUSCH and a number of transport blocks supported per slot. In some examples, uplink grant manager 725 may receive, from a base station, signaling including an uplink grant for one or more PUSCH repetitions based on the transmitted uplink data repetition capability report. In some examples, the uplink repetition manager 730 may transmit, to the base station, the one or more PUSCH repetitions based on the uplink grant.

The transmitter 735 may transmit signals generated by other components of the device 705. In some examples, the transmitter 735 may be collocated with a receiver 710 in a transceiver module. For example, the transmitter 735 may be an example of aspects of the transceiver 920 described with reference to FIG. 9. The transmitter 735 may utilize a single antenna or a set of antennas.

Figure 8:
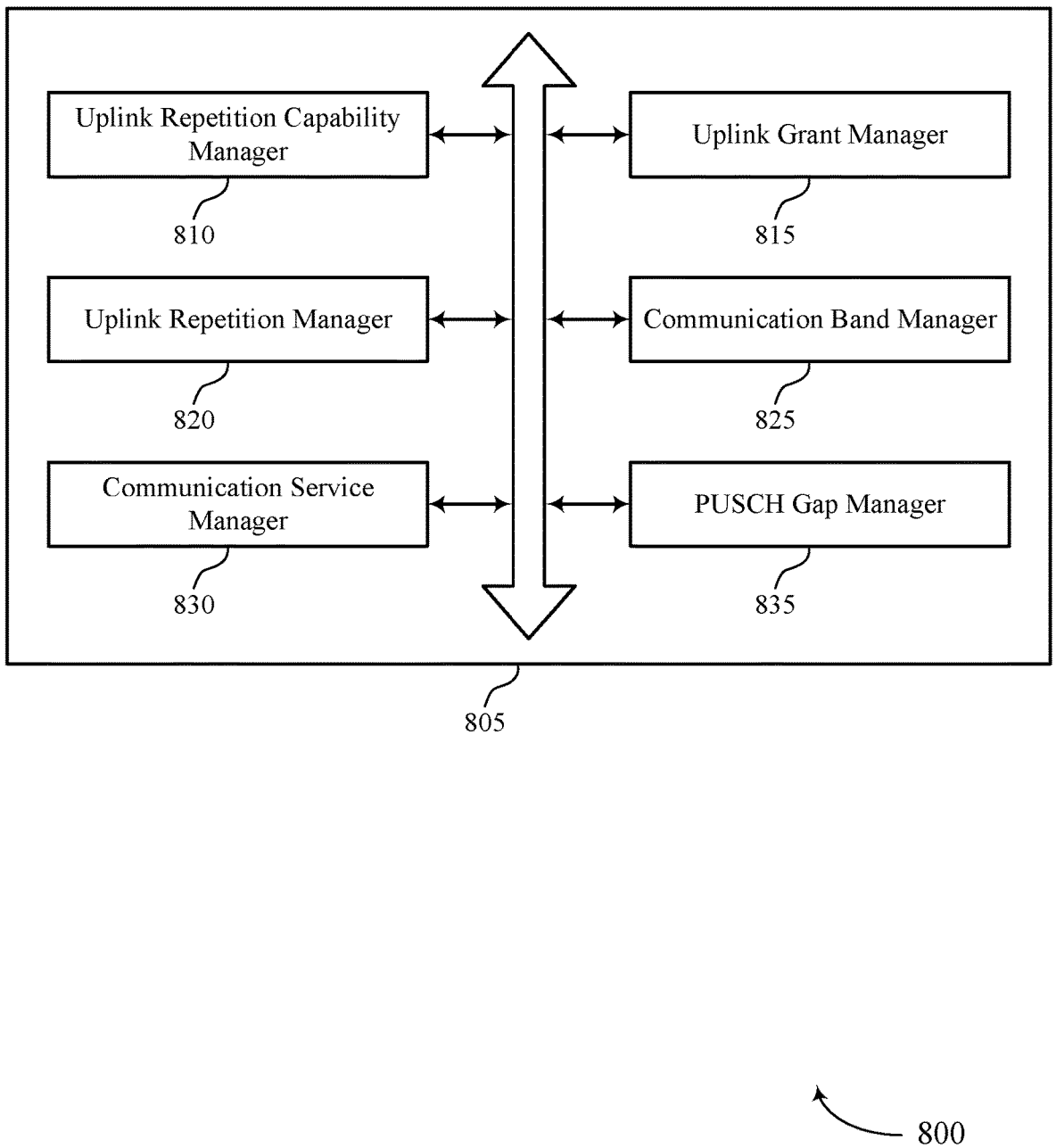
FIG. 8 shows a block diagram of a communications manager that supports capability signaling for PUSCH repetition in accordance with aspects of the present disclosure.

FIG. 8 shows a block diagram 800 of a communications manager 805 that supports capability signaling for PUSCH repetition in accordance with aspects of the present disclosure. The communications manager 805 may be an example of aspects of a communications manager 615, a communications manager 715, or a communications manager 910 described herein. The communications manager 805 may include an uplink repetition capability manager 810, an uplink grant manager 815, an uplink repetition manager 820, a communication band manager 825, a communication service manager 830, and a PUSCH gap manager 835. Each of these modules may communicate, directly or indirectly, with one another (e.g., via one or more buses).

The uplink repetition capability manager 810 may transmit an uplink data repetition capability report to a base station, where the uplink data repetition capability report includes at least an indication of a number of data repetitions supported per transport block and a number of transport blocks supported per slot. In some examples, determining the uplink data repetition capability report based on a first band of the one or more bands, where the uplink data repetition capability report includes an indication that uplink data repetition is supported in the first band. In some examples, the uplink repetition capability manager 810 may determine a second uplink data repetition capability report based on a second band of the one or more bands. In some examples, transmitting, to the base station, the second uplink data repetition capability report, where the second uplink data repetition capability report includes an indication that uplink data repetition is supported in the second band according to the second uplink data repetition capability report.

In some examples, the uplink repetition capability manager 810 may determine the uplink data repetition capability report based on the first configured service type and the second configured service type. In some examples, the uplink repetition capability manager 810 may determine the number of transport blocks supported per slot based on the first configured service type and the second configured service type. In some examples, the uplink repetition capability manager 810 may determine the uplink data repetition capability report based on the determined gap. In some examples, the uplink repetition capability manager 810 may determine the number of transport blocks supported per slot based on reducing a second number of transport blocks supported per slot according to the gap, where the second number of transport blocks supported per slot is associated with non-repeated uplink data transmissions supported per slot.

In some cases, the uplink data repetition capability report includes an indication of whether the UE supports uplink data repetition for the first configured service type, an indication of whether the UE supports uplink data repetition for the second configured service type, an indication of a number of transport blocks supported per slot for the first service type, an indication of a number of transport blocks supported per slot for the second service type, or some combination thereof. In some cases, the uplink data repetition capability report includes an indication of a minimum length of each repetition bundle including data repetitions. In some cases, the indication of the number of data repetitions supported per transport block and the number of transport blocks supported per slot includes an indication of a number of physical uplink shared channel repetitions and a number of physical uplink shared channels per slot.

In some examples, uplink repetition capability manager 810 may transmit an uplink data repetition capability report to a base station, where the uplink data repetition capability report includes an indication of a number of PUSCH transmissions supported per slot, the number of PUSCH transmissions being associated with a number of PUSCH and a number of transport blocks supported per slot. In some examples, determining the uplink data repetition capability report based on a first band of the one or more bands, where the uplink data repetition capability report includes an indication that uplink data repetition is supported in the first band. In some examples, determining the uplink data repetition capability report based on a second band of the one or more bands, where the uplink data repetition capability report includes an indication of a number of PUSCH transmissions supported per slot for the second band. In some examples, the uplink repetition capability manager 810 may determine the uplink data repetition capability report based on the first channel priority of the first PUSCH and the second channel priority of the second PUSCH. In some examples, determining the uplink data repetition capability report based on the first channel priority of the first PUSCH and the second channel priority of the second PUSCH includes determining the number of transport blocks supported per slot based on the first channel priority of the first PUSCH and the second channel priority of the second PUSCH.

In some examples, the uplink repetition capability manager 810 may determine the uplink data repetition capability report based on the determined gap. In some examples, the uplink repetition capability manager 810 may determine the uplink data repetition capability report based on a configured subcarrier spacing, one or more processing capabilities of the UE, or some combination thereof. In some cases, the uplink data repetition capability report includes an indication of whether the UE supports PUSCH repetition for the first channel priority of the first PUSCH, an indication of whether the UE supports PUSCH repetition for the second channel priority of the second PUSCH, an indication of a number of transport blocks supported per slot for the first channel priority of the first PUSCH, an indication of a number of transport blocks supported per slot for the second channel priority of the second PUSCH, or some combination thereof. In some cases, the indication of the number of PUSCH transmissions supported per slot includes an indication of a number of PUSCH repetitions and a number of PUSCH per slot.

The uplink grant manager 815 may receive, from a base station, signaling including an uplink grant for one or more data repetitions based on the transmitted uplink data repetition capability report. In some examples, the uplink grant manager 815 may receive, from a base station, signaling including an uplink grant for one or more PUSCH repetitions based on the transmitted uplink data repetition capability report. The uplink repetition manager 820 may transmit, to the base station, the one or more data repetitions based on the uplink grant. In some examples, the uplink repetition manager 820 may transmit, to the base station, the one or more PUSCH repetitions based on the uplink grant.

The communication band manager 825 may identify one or more bands of a configured band combination.

The communication service manager 830 may identify a first configured service type, where the uplink data repetition capability report is determined based on the first configured service type. In some examples, the communication service manager 830 may identify a first configured service type and a second configured service type. In some examples, the communication service manager 830 may identify a first configured service type, where the gap is determined based on the first configured service type. In some cases, the uplink data repetition capability report includes an indication of the first service type. In some cases, the first service type includes an enhanced mobile broadband service type and the second service type includes an ultra-reliable low-latency communication service type. In some examples, the communication service manager 830 may identify a first channel priority of a first PUSCH, where the uplink data repetition capability report is determined based on the first channel priority of the first PUSCH. In some examples, the communication service manager 830 may identify a first channel priority of a first PUSCH and a second channel priority of a second PUSCH. In some cases, the uplink data repetition capability report includes an indication associated with the first channel priority of the first PUSCH. In some cases, the first channel priority of the first PUSCH corresponds to an enhanced mobile broadband service and the second channel priority of the second PUSCH corresponds to an ultra-reliable low-latency communication service.

The PUSCH gap manager 835 may determine a gap between non-repeated uplink data transmissions, where the uplink data repetition capability report includes an indication of the gap. In some cases, the gap is determined based on a configured subcarrier spacing, one or more processing capabilities of the UE, or some combination thereof.

Figure 9:
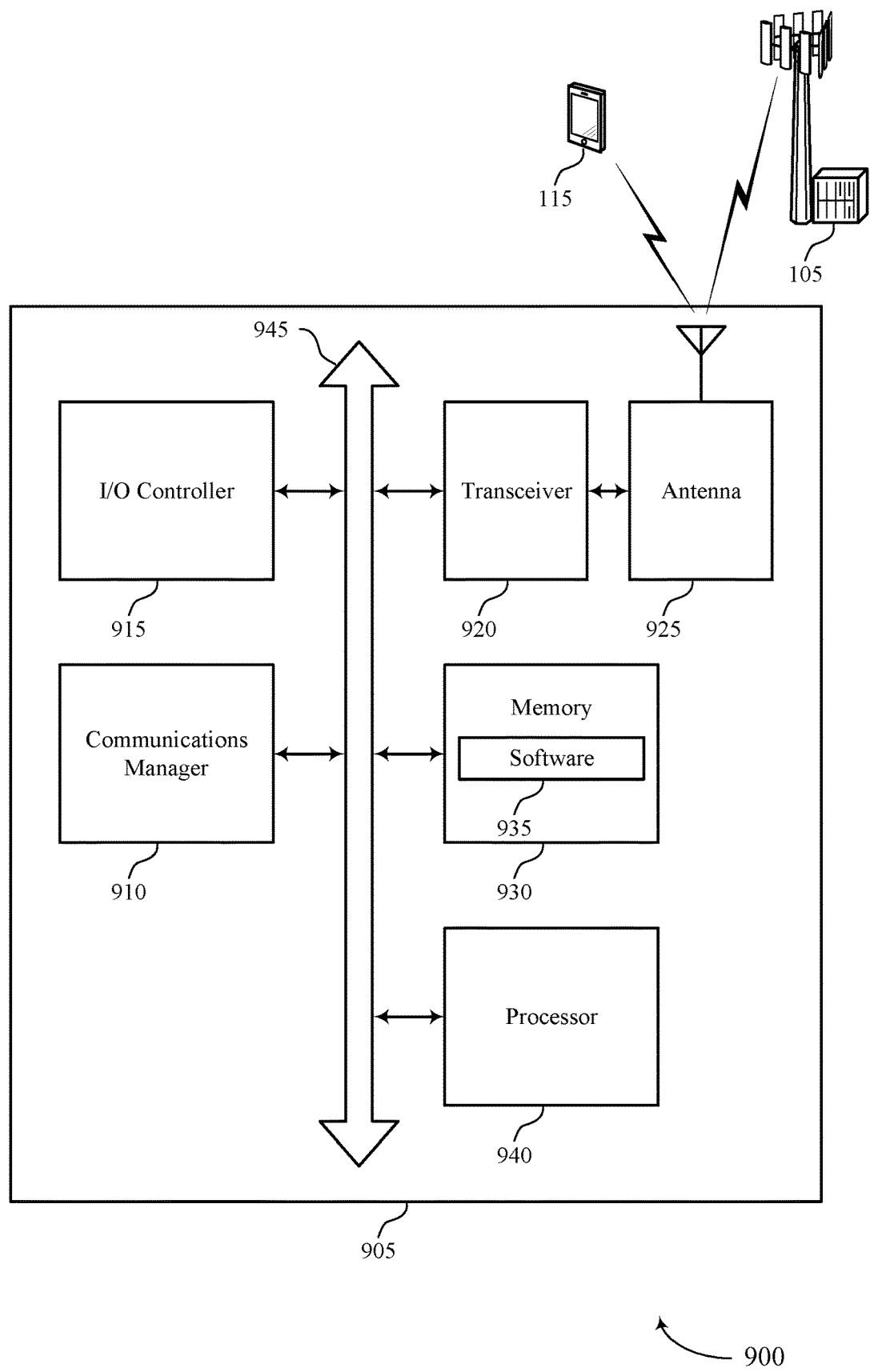
FIG. 9 shows a diagram of a system including a device that supports capability signaling for PUSCH repetition in accordance with aspects of the present disclosure.

FIG. 9 shows a diagram of a system 900 including a device 905 that supports capability signaling for PUSCH repetition in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may transmit an uplink data repetition capability report to a base station, where the uplink data repetition capability report includes at least an indication of a number of data repetitions supported per transport block and a number of transport blocks supported per slot, receive, from a base station, signaling including an uplink grant for one or more data repetitions based on the transmitted uplink data repetition capability report, and transmit, to the base station, the one or more data repetitions based on the uplink grant.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include RAM and ROM. The memory 930 may store computer-readable, computer-executable code or software 935 including instructions that, when executed, cause the processor to perform various functions described herein. In some cases, the memory 930 may contain, among other things, a BIOS which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting capability signaling for PUSCH repetition).

The software 935 may include instructions to implement aspects of the present disclosure, including instructions to support wireless communications. The software 935 may be stored in a non-transitory computer-readable medium such as system memory or other type of memory. In some cases, the software 935 may not be directly executable by the processor 940 but may cause a computer (e.g., when compiled and executed) to perform functions described herein.

Figure 10:
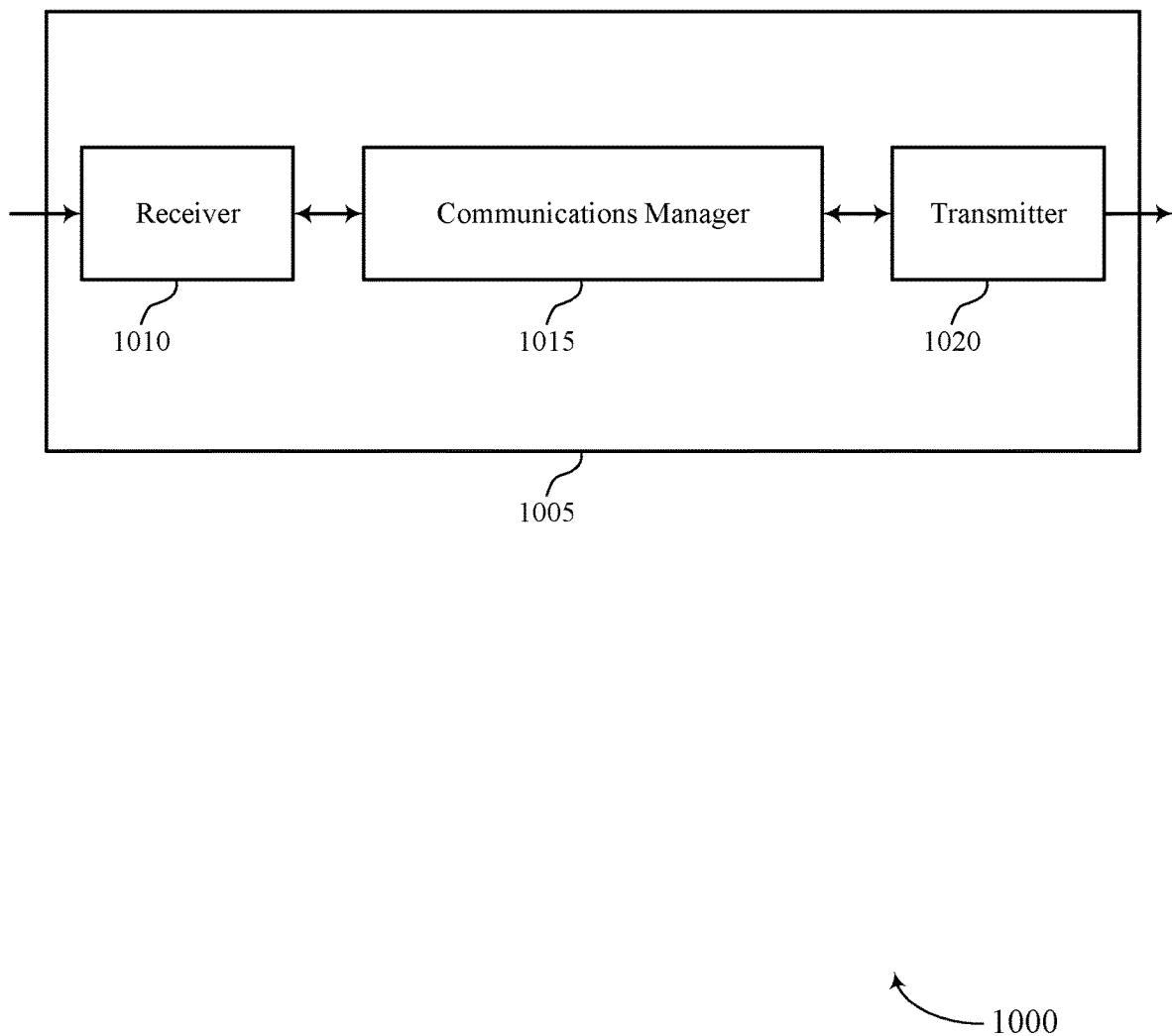
FIGS. 10 and 11 show block diagrams of devices that support capability signaling for PUSCH repetition in accordance with aspects of the present disclosure.

FIG. 10 shows a block diagram 1000 of a device 1005 that supports capability signaling for PUSCH repetition in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to capability signaling for PUSCH repetition, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may receive an uplink data repetition capability report from a UE, where the uplink data repetition capability report includes at least an indication of a number of data repetitions per transport block supported by the UE and a number of transport blocks per slot supported by the UE, transmit, to the UE, signaling including an uplink grant for one or more data repetitions based on the received uplink data repetition capability report, and receive, from the UE, the one or more data repetitions based on the uplink grant. In some examples, the communications manager 1015 may receive an uplink data repetition capability report from a UE, where the uplink data repetition capability report includes an indication of a number of PUSCH transmissions supported per slot supported by the UE, the number of PUSCH transmissions being associated with a number of PUSCH repetitions supported by the UE and a number of transport blocks supported per slot supported by the UE, transmit, to the UE, signaling including an uplink grant for one or more PUSCH repetitions based on the received uplink data repetition capability report, and receive, from the UE, the one or more PUSCH repetitions based on the uplink grant. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
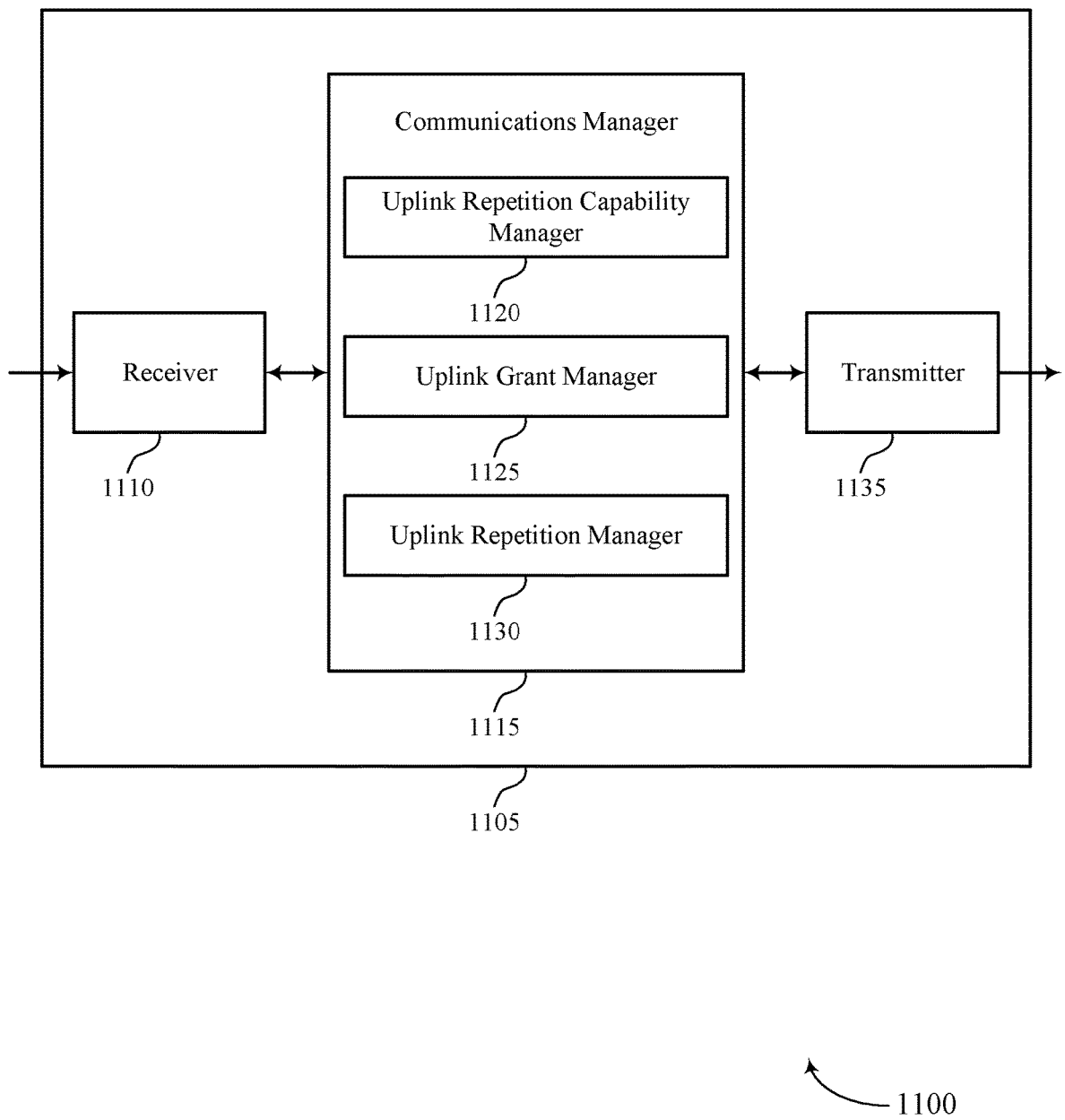

FIG. 11 shows a block diagram 1100 of a device 1105 that supports capability signaling for PUSCH repetition in accordance with aspects of the present disclosure. The device 1105 may be an example of aspects of a device 1005, or a base station 105 as described herein. The device 1105 may include a receiver 1110, a communications manager 1115, and a transmitter 1135. The device 1105 may also include a processor. Each of these components may be in communication with one another (e.g., via one or more buses).

The receiver 1110 may receive information such as packets, user data, or control information associated with various information channels (e.g., control channels, data channels, and information related to capability signaling for PUSCH repetition, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include an uplink repetition capability manager 1120, an uplink grant manager 1125, and an uplink repetition manager 1130. The communications manager 1115 may be an example of aspects of the communications manager 1310 described herein.

The uplink repetition capability manager 1120 may receive an uplink data repetition capability report from a UE, where the uplink data repetition capability report includes at least an indication of a number of data repetitions per transport block supported by the UE and a number of transport blocks per slot supported by the UE. The uplink grant manager 1125 may transmit, to the UE, signaling including an uplink grant for one or more data repetitions based on the received uplink data repetition capability report. The uplink repetition manager 1130 may receive, from the UE, the one or more data repetitions based on the uplink grant.

The transmitter 1135 may transmit signals generated by other components of the device 1105. In some examples, the transmitter 1135 may be collocated with a receiver 1110 in a transceiver module. For example, the transmitter 1135 may be an example of aspects of the transceiver 1320 described with reference to FIG. 13. The transmitter 1135 may utilize a single antenna or a set of antennas.

Figure 12:
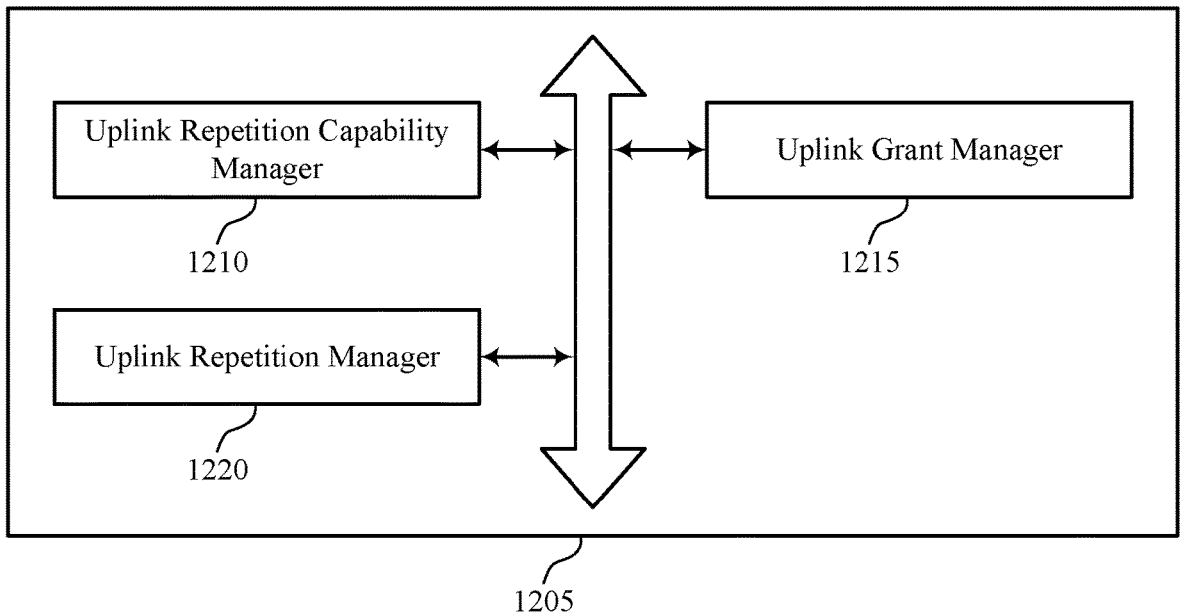
FIG. 12 shows a block diagram of a communications manager that supports capability signaling for PUSCH repetition in accordance with aspects of the present disclosure.

FIG. 12 shows a block diagram 1200 of a communications manager 1205 that supports capability signaling for PUSCH repetition in accordance with aspects of the present disclosure. The communications manager 1205 may be an example of aspects of a communications manager 1015, a communications manager 1115, or a communications manager 1310 described herein. The communications manager 1205 may include an uplink repetition capability manager 1210, an uplink grant manager 1215, and an uplink repetition manager 1220. Each of these modules may communicate, directly or indirectly, with one another (e.g., via one or more buses).

The uplink repetition capability manager 1210 may receive an uplink data repetition capability report from a UE, where the uplink data repetition capability report includes at least an indication of a number of data repetitions per transport block supported by the UE and a number of transport blocks per slot supported by the UE. In some examples, receiving, from the UE, a second uplink data repetition capability report, where the second uplink data repetition capability report includes an indication that uplink data repetition is supported in a second band according to the second uplink data repetition capability report. In some examples, receiving, from the UE, a second uplink data repetition capability report, where the second uplink data repetition capability report includes an indication of a second service type associated with the second uplink data repetition capability report.

In some cases, the uplink data repetition capability report includes an indication that uplink data repetition is supported in a first band of one or more bands of a configured band combination. In some cases, the uplink data repetition capability report includes an indication of the a service type associated with the uplink data repetition capability report. In some cases, the uplink data repetition capability report includes an indication of a first service type associated with the uplink data repetition capability report and an indication of a second service type associated with the uplink data repetition capability report. In some cases, the uplink data repetition capability report includes an indication of whether the UE supports uplink data repetition for the first configured service type, an indication of whether the UE supports uplink data repetition for the second configured service type, an indication of a number of transport blocks per slot supported by the UE for the first service type, an indication of a number of transport blocks per slot supported by the UE for the second service type, or some combination thereof.

In some cases, the first service type includes an enhanced mobile broadband service type and the second service type includes an ultra-reliable low-latency communication service type. In some cases, the uplink data repetition capability report includes an indication of a gap between non-repeated uplink data transmissions, an indication of a minimum length of each repetition bundle including data repetitions, or both. In some cases, the indication of the number of data repetitions per transport block supported by the UE and the number of transport blocks per slot supported by the UE includes an indication of a number of physical uplink shared channel repetitions supported by the UE and a number of physical uplink shared channels per slot supported by the UE.

The uplink grant manager 1215 may transmit, to the UE, signaling including an uplink grant for one or more data repetitions based on the received uplink data repetition capability report. The uplink repetition manager 1220 may receive, from the UE, the one or more data repetitions based on the uplink grant.

Figure 13:
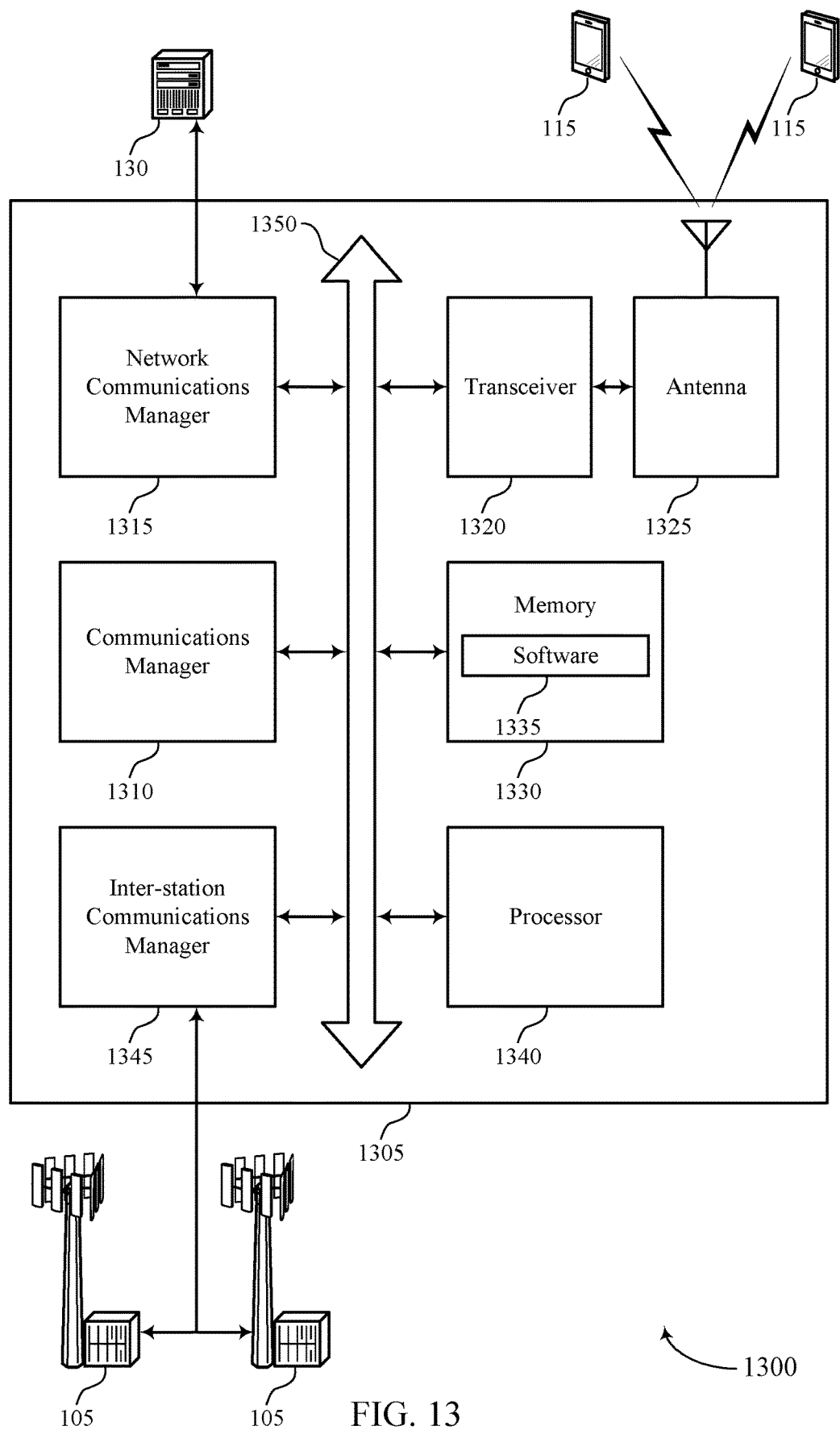
FIG. 13 shows a diagram of a system including a device that supports capability signaling for PUSCH repetition in accordance with aspects of the present disclosure.

FIG. 13 shows a diagram of a system 1300 including a device 1305 that supports capability signaling for PUSCH repetition in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may receive an uplink data repetition capability report from a UE, where the uplink data repetition capability report includes at least an indication of a number of data repetitions per transport block supported by the UE and a number of transport blocks per slot supported by the UE, transmit, to the UE, signaling including an uplink grant for one or more data repetitions based on the received uplink data repetition capability report, and receive, from the UE, the one or more data repetitions based on the uplink grant.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code or software 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting capability signaling for PUSCH repetition).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The software 1335 may include instructions to implement aspects of the present disclosure, including instructions to support wireless communications. The software 1335 may be stored in a non-transitory computer-readable medium such as system memory or other type of memory. In some cases, the software 1335 may not be directly executable by the processor 1340 but may cause a computer (e.g., when compiled and executed) to perform functions described herein.

Figure 14:
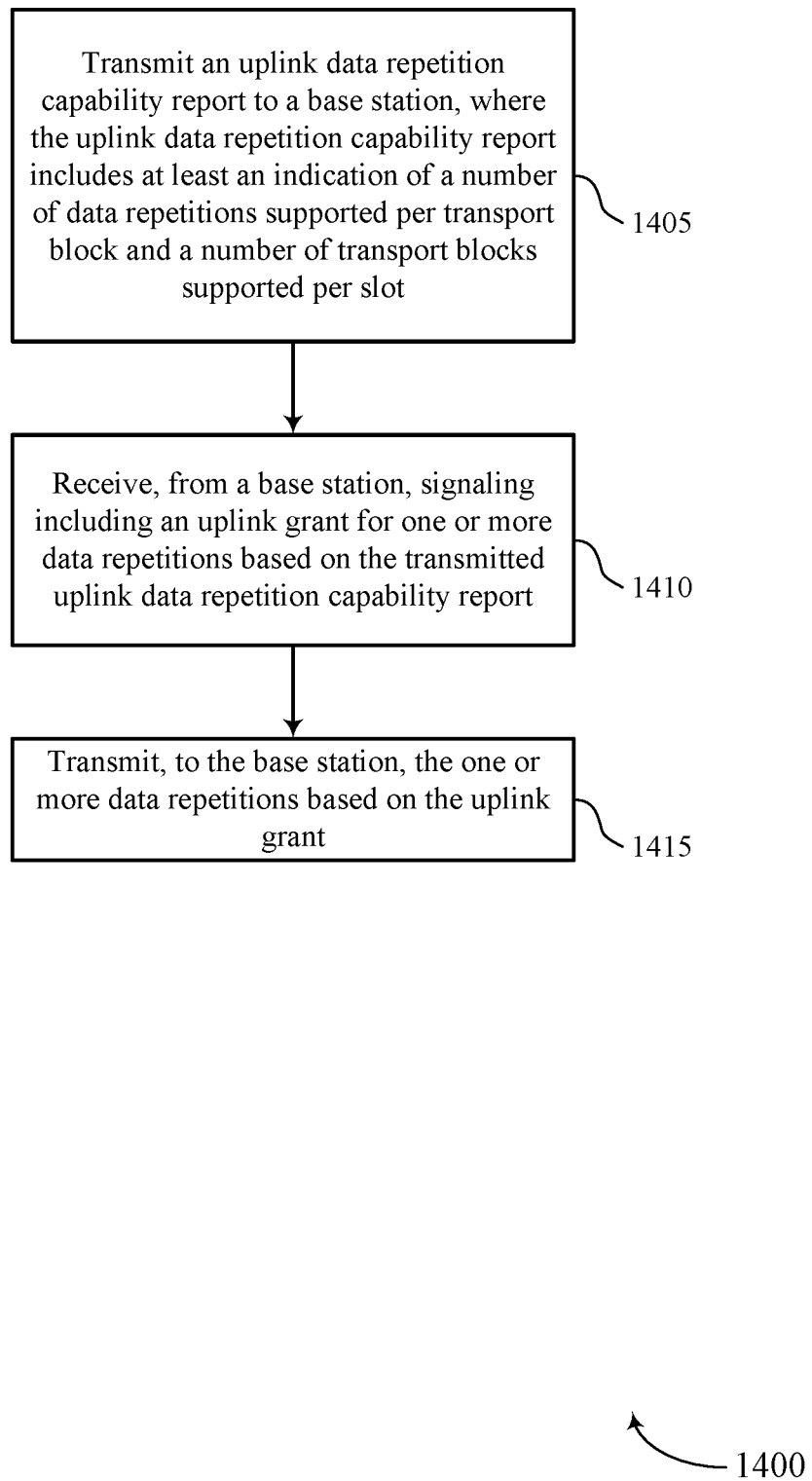
FIGS. 14 through 18 show flowcharts illustrating methods that support capability signaling for PUSCH repetition in accordance with aspects of the present disclosure.

FIG. 14 shows a flowchart illustrating a method 1400 that supports capability signaling for PUSCH repetition in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1405, the UE may transmit an uplink data repetition capability report to a base station, where the uplink data repetition capability report includes at least an indication of a number of data repetitions supported per transport block and a number of transport blocks supported per slot. The operations of 1405 may be performed according to the methods described herein. In some examples, aspects of the operations of 1405 may be performed by an uplink repetition capability manager as described with reference to FIGS. 6 through 9.

At 1410, the UE may receive, from a base station, signaling including an uplink grant for one or more data repetitions based on the transmitted uplink data repetition capability report. The operations of 1410 may be performed according to the methods described herein. In some examples, aspects of the operations of 1410 may be performed by an uplink grant manager as described with reference to FIGS. 6 through 9.

At 1415, the UE may transmit, to the base station, the one or more data repetitions based on the uplink grant. The operations of 1415 may be performed according to the methods described herein. In some examples, aspects of the operations of 1415 may be performed by an uplink repetition manager as described with reference to FIGS. 6 through 9.

Figure 15:
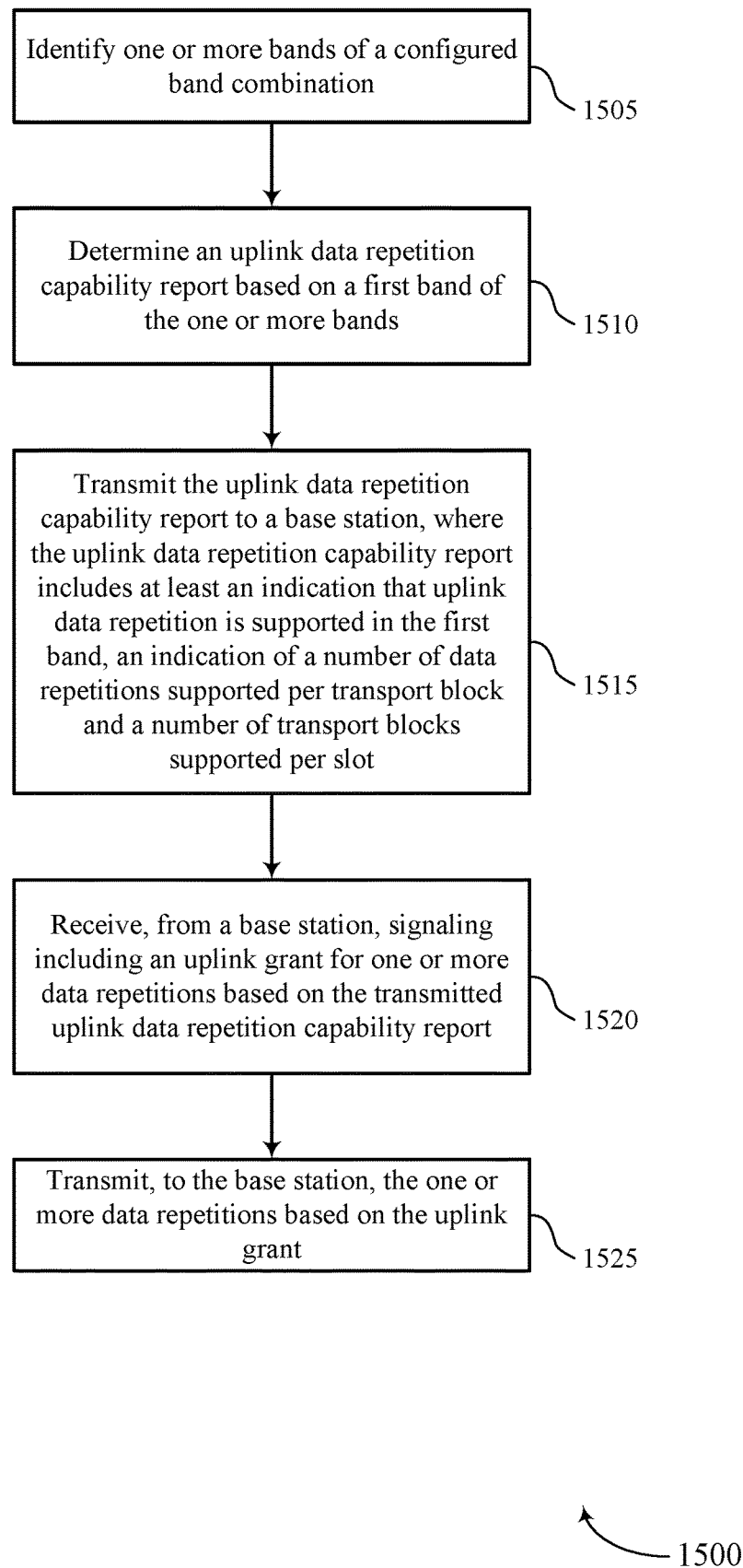

FIG. 15 shows a flowchart illustrating a method 1500 that supports capability signaling for PUSCH repetition in accordance with aspects of the present disclosure. The operations of method 1500 may be implemented by a UE 115 or its components as described herein. For example, the operations of method 1500 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1505, the UE may identify one or more bands of a configured band combination. The operations of 1505 may be performed according to the methods described herein. In some examples, aspects of the operations of 1505 may be performed by a communication band manager as described with reference to FIGS. 6 through 9.

At 1510, the UE may determine an uplink data repetition capability report based on a first band of the one or more bands. For example, the UE may determine uplink data repetition capabilities per-BoBC and generate an uplink data repetition capability report to indicate the uplink data repetition capabilities of the UE. The operations of 1510 may be performed according to the methods described herein. In some examples, aspects of the operations of 1510 may be performed by an uplink repetition capability manager as described with reference to FIGS. 6 through 9.

At 1515, the UE may transmit the uplink data repetition capability report to a base station, where the uplink data repetition capability report includes at least an indication that uplink data repetition is supported in the first band, an indication of a number of data repetitions supported per transport block, and a number of transport blocks supported per slot. The operations of 1515 may be performed according to the methods described herein. In some examples, aspects of the operations of 1515 may be performed by an uplink repetition capability manager as described with reference to FIGS. 6 through 9.

At 1520, the UE may receive, from a base station, signaling including an uplink grant for one or more data repetitions based on the transmitted uplink data repetition capability report. The operations of 1520 may be performed according to the methods described herein. In some examples, aspects of the operations of 1520 may be performed by an uplink grant manager as described with reference to FIGS. 6 through 9.

At 1525, the UE may transmit, to the base station, the one or more data repetitions based on the uplink grant. The operations of 1525 may be performed according to the methods described herein. In some examples, aspects of the operations of 1525 may be performed by an uplink repetition manager as described with reference to FIGS. 6 through 9.

Figure 16:
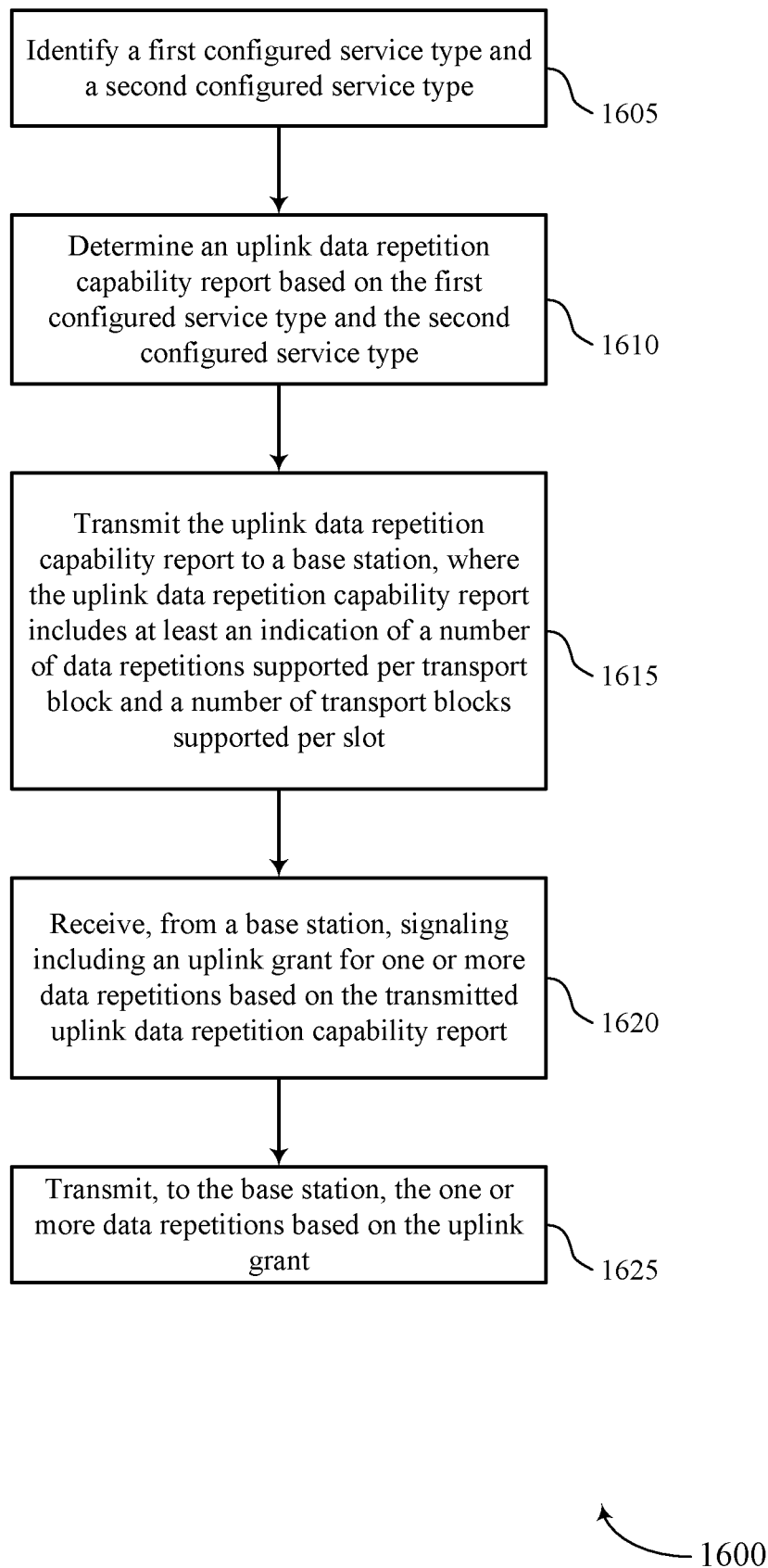

FIG. 16 shows a flowchart illustrating a method 1600 that supports capability signaling for PUSCH repetition in accordance with aspects of the present disclosure. The operations of method 1600 may be implemented by a UE 115 or its components as described herein. For example, the operations of method 1600 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1605, the UE may identify a first configured service type and a second configured service type. The operations of 1605 may be performed according to the methods described herein. In some examples, aspects of the operations of 1605 may be performed by a communication service manager as described with reference to FIGS. 6 through 9.

At 1610, the UE may determine an uplink data repetition capability report based on the first configured service type and the second configured service type. For example, the UE may determine uplink data repetition capabilities per-service type and generate an uplink data repetition capability report to indicate the uplink data repetition capabilities of the UE. The operations of 1610 may be performed according to the methods described herein. In some examples, aspects of the operations of 1610 may be performed by an uplink repetition capability manager as described with reference to FIGS. 6 through 9.

At 1615, the UE may transmit the uplink data repetition capability report to a base station, where the uplink data repetition capability report includes at least an indication of a number of data repetitions supported per transport block and a number of transport blocks supported per slot. The operations of 1615 may be performed according to the methods described herein. In some examples, aspects of the operations of 1615 may be performed by an uplink repetition capability manager as described with reference to FIGS. 6 through 9.

At 1620, the UE may receive, from a base station, signaling including an uplink grant for one or more data repetitions based on the transmitted uplink data repetition capability report. The operations of 1620 may be performed according to the methods described herein. In some examples, aspects of the operations of 1620 may be performed by an uplink grant manager as described with reference to FIGS. 6 through 9.

At 1625, the UE may transmit, to the base station, the one or more data repetitions based on the uplink grant. The operations of 1625 may be performed according to the methods described herein. In some examples, aspects of the operations of 1625 may be performed by an uplink repetition manager as described with reference to FIGS. 6 through 9.

Figure 17:
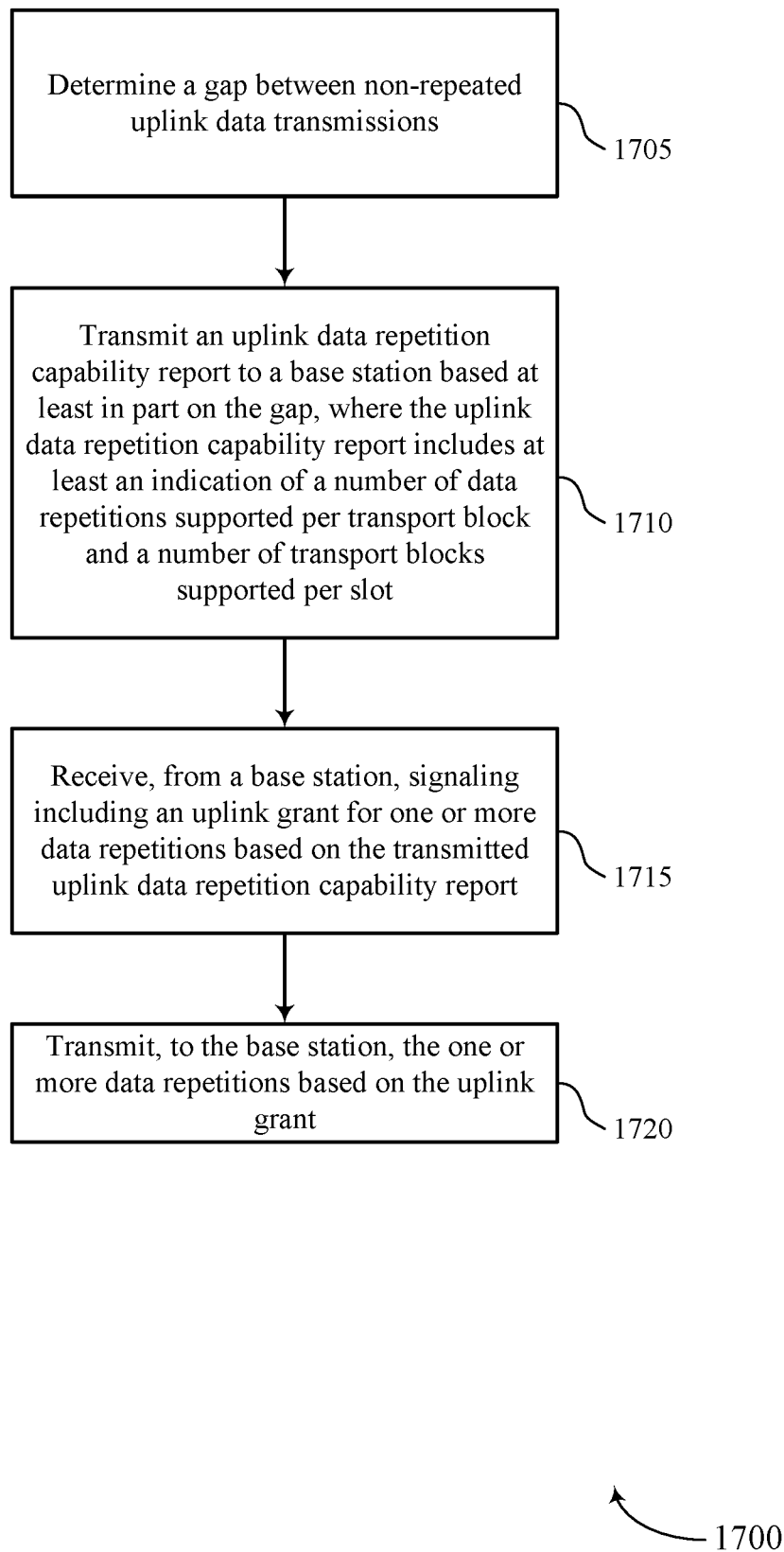

FIG. 17 shows a flowchart illustrating a method 1700 that supports capability signaling for PUSCH repetition in accordance with aspects of the present disclosure. The operations of method 1700 may be implemented by a UE 115 or its components as described herein. For example, the operations of method 1700 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1705, the UE may determine a gap between non-repeated uplink data transmissions. The operations of 1705 may be performed according to the methods described herein. In some examples, aspects of the operations of 1705 may be performed by a PUSCH gap manager as described with reference to FIGS. 6 through 9.

At 1710, the UE may transmit an uplink data repetition capability report to a base station (e.g., based at least in part on the gap), where the uplink data repetition capability report includes at least an indication of a number of data repetitions supported per transport block and a number of transport blocks supported per slot. In some cases, the reported uplink data repetition capabilities may take into account the determined gap. In some cases, the uplink data repetition capability report may include an indication of the gap. The operations of 1710 may be performed according to the methods described herein. In some examples, aspects of the operations of 1710 may be performed by an uplink repetition capability manager as described with reference to FIGS. 6 through 9.

At 1715, the UE may receive, from a base station, signaling including an uplink grant for one or more data repetitions based on the transmitted uplink data repetition capability report. The operations of 1715 may be performed according to the methods described herein. In some examples, aspects of the operations of 1715 may be performed by an uplink grant manager as described with reference to FIGS. 6 through 9.

At 1720, the UE may transmit, to the base station, the one or more data repetitions based on the uplink grant. The operations of 1720 may be performed according to the methods described herein. In some examples, aspects of the operations of 1720 may be performed by an uplink repetition manager as described with reference to FIGS. 6 through 9.

Figure 18:
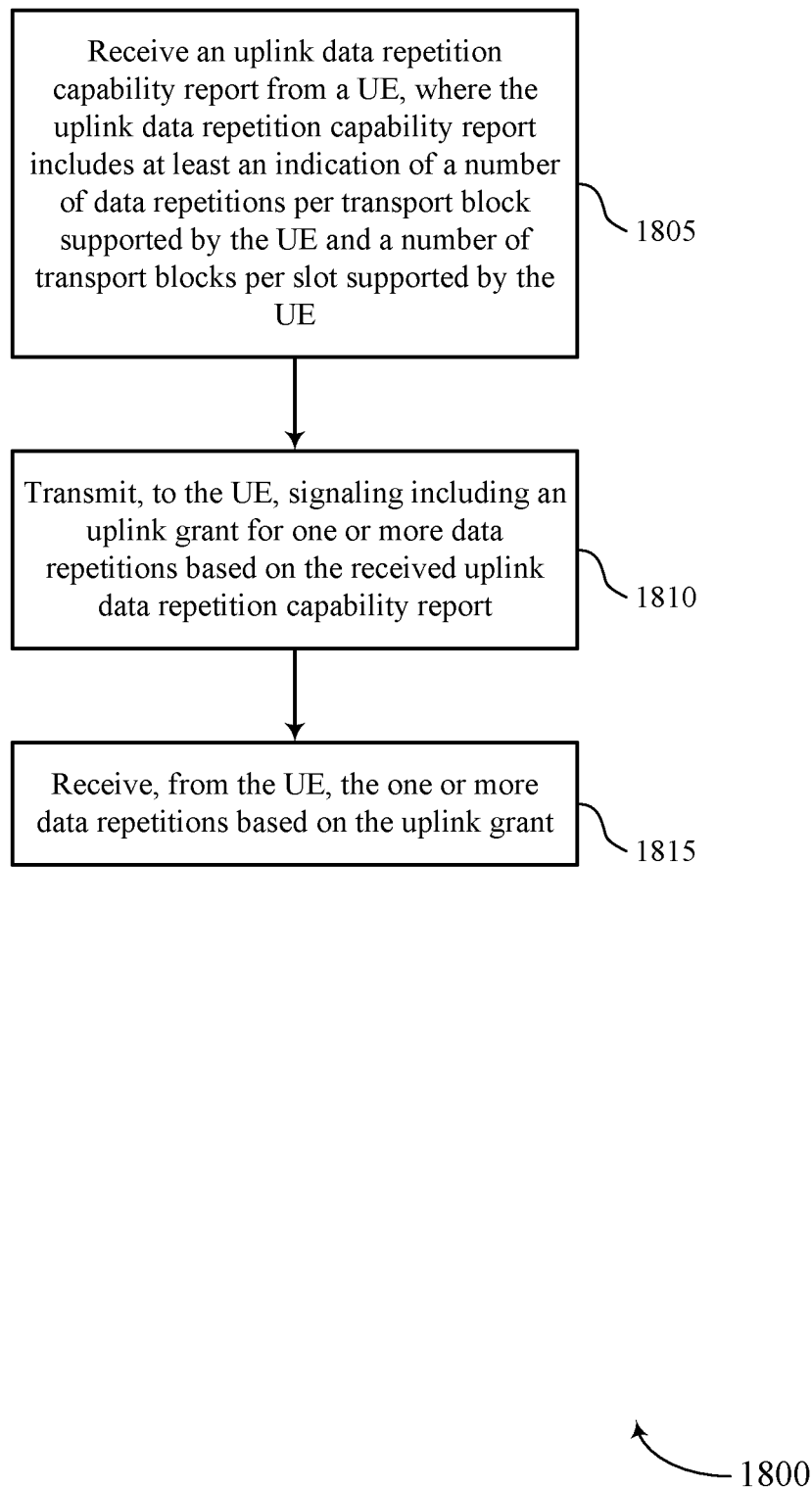

FIG. 18 shows a flowchart illustrating a method 1800 that supports capability signaling for PUSCH repetition in accordance with aspects of the present disclosure. The operations of method 1800 may be implemented by a base station 105 or its components as described herein. For example, the operations of method 1800 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1805, the base station may receive an uplink data repetition capability report from a UE, where the uplink data repetition capability report includes at least an indication of a number of data repetitions per transport block supported by the UE and a number of transport blocks per slot supported by the UE. The operations of 1805 may be performed according to the methods described herein. In some examples, aspects of the operations of 1805 may be performed by an uplink repetition capability manager as described with reference to FIGS. 10 through 13.

At 1810, the base station may transmit, to the UE, signaling including an uplink grant for one or more data repetitions based on the received uplink data repetition capability report. The operations of 1810 may be performed according to the methods described herein. In some examples, aspects of the operations of 1810 may be performed by an uplink grant manager as described with reference to FIGS. 10 through 13.

At 1815, the base station may receive, from the UE, the one or more data repetitions based on the uplink grant. The operations of 1815 may be performed according to the methods described herein. In some examples, aspects of the operations of 1815 may be performed by an uplink repetition manager as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A user equipment (UE) for wireless communication, comprising:
   one or more memories storing processor-executable code; and
   one or more processors coupled with the one or more memories and individually or collectively operable to execute the code to cause the UE to:
      transmit, to a network entity, an uplink data repetition capability report comprising an indication of whether the UE supports sub-slot physical uplink shared channel (PUSCH) repetition and a quantity of PUSCH transmissions supported per slot by the UE, wherein the uplink data repetition capability report indicates different PUSCH repetition capabilities associated with different processing time capabilities of the UE for different service types and indicates a maximum quantity of PUSCH transmissions supported per slot for all transport blocks (TBs) permitted in a slot, wherein each PUSCH repetition is counted as one PUSCH transmission of the maximum quantity of PUSCH transmissions;
      receive signaling comprising an uplink grant configuring one or more PUSCH repetitions within a slot based at least in part on the uplink data repetition capability report; and
      transmit, based at least in part on the uplink grant, the one or more configured PUSCH repetitions within the slot.

2. The UE of claim 1, wherein the uplink data repetition capability report comprises an indication that PUSCH repetition is supported in a first band at a sub-slot level and is not supported in a second band at the sub-slot level.

3. The UE of claim 1, wherein the uplink data repetition capability report indicates PUSCH repetition capabilities for each band of a configured band combination.

4. The UE of claim 1, wherein the one or more processors are individually or collectively further operable to execute the code to cause the UE to:
   determine the uplink data repetition capability report based on a determination that multiple PUSCH transmissions per repetition are supported by the UE.

5. The UE of claim 1, wherein the one or more processors are individually or collectively further operable to execute the code to cause the UE to:
   determine, based at least on a gap requirement between non-repeated PUSCH transmissions, the uplink data repetition capability report, wherein the uplink data repetition capability report comprises an indication of a defined gap.

6. The UE of claim 5, wherein the defined gap is based at least in part on a configured subcarrier spacing, one or more processing time capabilities of the UE, or a combination thereof.

7. The UE of claim 1, wherein the quantity of PUSCH transmissions supported per slot by the UE is based at least in part on a quantity of PUSCH repetitions supported per transport block by the UE and a quantity of transport blocks supported per slot by the UE.

8. The UE of claim 1, wherein, to receive the signaling comprising the uplink grant, the one or more processors are individually or collectively operable to execute the code to cause the UE to:
   receive the signaling comprising the uplink grant and a time domain resource assignment for transmission of the one or more configured PUSCH repetitions based at least in part on the uplink data repetition capability report, wherein the time domain resource assignment includes a start and length indicator value (SLIV) indicating a starting symbol and a transmission duration for the one or more configured PUSCH repetitions.

9. The UE of claim 8, wherein the one or more processors are individually or collectively further operable to execute the code to cause the UE to:

identify directions for a plurality of symbols spanning the transmission duration; and determine, based at least in part on the starting symbol and the identified directions for the plurality of symbols, a subset of the plurality of symbols for scheduling the one or more configured PUSCH repetitions.

10. The UE of claim 1, wherein the uplink data repetition capability report further comprises indications of:

a maximum length of each data repetition supported by the UE, and a maximum quantity of repetitions supported by the UE.

11. The UE of claim 10, wherein, based at least in part on the uplink data repetition capability report, the uplink grant includes a starting symbol index, a length of each data repetition, and a number of data repetitions permitted during uplink transmission.

12. The UE of claim 1, wherein the uplink data repetition capability report indicates different PUSCH repetition capabilities associated with PUSCH repetitions configuration for each of a first band and a second band of a configured band combination.

13. A method for wireless communications at a user equipment (UE), comprising:

transmitting, to a network entity, an uplink data repetition capability report comprising an indication of whether the UE supports sub-slot physical uplink shared channel (PUSCH) repetition and a quantity of PUSCH transmissions supported per slot by the UE, wherein the uplink data repetition capability report indicates different PUSCH repetition capabilities associated with different processing time capabilities of the UE for different service types and indicates a maximum quantity of PUSCH transmissions supported per slot for all transport blocks (TBs) permitted in a slot, wherein each PUSCH repetition is counted as one PUSCH transmission of the maximum quantity of PUSCH transmissions;

receiving signaling comprising an uplink grant configuring one or more PUSCH repetitions within a slot based at least in part on the uplink data repetition capability report; and transmitting, based at least in part on the uplink grant, the one or more configured PUSCH repetitions within the slot.

14. The method of claim 13, wherein the uplink data repetition capability report comprises an indication that PUSCH repetition is supported in a first band at a sub-slot level and is not supported in a second band at the sub-slot level.

15. The method of claim 13, wherein the uplink data repetition capability report indicates PUSCH repetition capabilities for each band of a configured band combination.

16. The method of claim 13, further comprising: determining the uplink data repetition capability report based on determining that multiple PUSCH transmissions per repetition are supported by the UE.

17. The method of claim 13, further comprising: determining, based at least on a gap between non-repeated PUSCH transmissions, the uplink data repetition capability report, wherein the uplink data repetition capability report comprises an indication of a defined gap.

18. The method of claim 17, wherein the defined gap is based at least in part on a configured subcarrier spacing, one or more processing capabilities of the UE, or a combination thereof.

19. The method of claim 13, wherein the quantity of PUSCH transmissions supported per slot by the UE is based at least in part on a quantity of PUSCH repetitions supported per transport block by the UE and a quantity of transport blocks supported per slot by the UE.

20. The method of claim 13, wherein receiving the signaling comprising the uplink grant comprises:

receiving the signaling comprising the uplink grant and a time domain resource assignment for transmitting the one or more configured PUSCH repetitions based at least in part on the uplink data repetition capability report, wherein the time domain resource assignment includes a start and length indicator value (SLIV) indicating a starting symbol and a transmission duration for the one or more configured PUSCH repetitions.

21. The method of claim 20, wherein the method further comprises:

identifying directions for a plurality of symbols spanning the transmission duration; and determining, based at least in part on the starting symbol and the identified directions for the plurality of symbols, a subset of the plurality of symbols for scheduling the one or more configured PUSCH repetitions.

22. The method of claim 13, wherein the uplink data repetition capability report further comprises indications of:

a maximum length of each data repetition supported by the UE, and a maximum quantity of repetitions supported by the UE.

23. The method of claim 22, wherein the uplink grant, based at least in part on the uplink data repetition capability report, includes a starting symbol index, a length of each data repetition, and a number of data repetitions permitted during uplink transmission.

24. The method of claim 13, wherein the quantity of PUSCH transmissions supported per slot by the UE is based at least in part on a quantity of transport blocks supported per slot by the UE, and wherein each transport block of the quantity of transport blocks comprises one PUSCH repetition.

25. A non-transitory, computer-readable medium storing code for wireless communication at a user equipment (UE), the code comprising instructions executable by one or more processors to:

transmit, to a network entity, an uplink data repetition capability report comprising an indication of whether the UE supports sub-slot physical uplink shared channel (PUSCH) repetition and a quantity of PUSCH transmissions supported per slot by the UE, wherein the uplink data repetition capability report indicates different PUSCH repetition capabilities associated with different processing time capabilities of the UE for different service types and indicates a maximum quantity of PUSCH transmissions supported per slot for all transport blocks (TBs) permitted in a slot, wherein each PUSCH repetition is counted as one PUSCH transmission of the maximum quantity of PUSCH transmissions;

receive signaling comprising an uplink grant configuring one or more PUSCH repetitions within a slot based at least in part on the uplink data repetition capability report; and transmit, based at least in part on the uplink grant, the one or more configured PUSCH repetitions within the slot.

26. The non-transitory, computer-readable medium of claim 25, wherein the quantity of PUSCH transmissions supported per slot by the UE is based at least in part on a quantity of transport blocks supported per slot by the UE, and wherein each transport block of the quantity of transport blocks comprises one PUSCH repetition.

27. The non-transitory, computer-readable medium of claim 25,
wherein the uplink data repetition capability report comprises an indication that PUSCH repetition is supported in a first band at a sub-slot level and is not supported in a second band at the sub-slot level.

28. The non-transitory, computer-readable medium of claim 25, wherein the uplink data repetition capability report indicates PUSCH repetition capabilities for each band of a configured band combination.

29. A user equipment (UE) for wireless communication, comprising:
means for transmitting, to a network entity, an uplink data repetition capability report comprising an indication of whether the UE supports sub-slot physical uplink shared channel (PUSCH) repetition and a quantity of PUSCH transmissions supported per slot by the UE, wherein the uplink data repetition capability report indicates different PUSCH repetition capabilities associated with different processing time capabilities of the UE for different service types and indicates a maximum quantity of PUSCH transmissions supported per slot for all transport blocks (TBs) permitted in a slot, wherein each PUSCH repetition is counted as one PUSCH transmission of the maximum quantity of PUSCH transmissions;

means for receiving signaling comprising an uplink grant configuring one or more PUSCH repetitions within a slot based at least in part on the uplink data repetition capability report; and means for transmitting, based at least in part on the uplink grant, the one or more configured PUSCH repetitions within the slot.

30. The UE of claim 29, wherein the quantity of PUSCH transmissions supported per slot by the UE is based at least in part on a quantity of transport blocks supported per slot by the UE, and wherein each transport block of the quantity of transport blocks comprises one PUSCH repetition.

* * * * *